(12) United States Patent
Wolery et al.

(10) Patent No.: US 7,921,041 B1
(45) Date of Patent: *Apr. 5, 2011

(54) SYSTEM AND METHOD FOR ALLOWING A VEHICLE OWNER TO OBTAIN A VEHICLE REPAIR ESTIMATE

(76) Inventors: Alan K. Wolery, Delaware, OH (US); Eric M. Gayan, Dublin, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/644,962

(22) Filed: Dec. 22, 2009

Related U.S. Application Data

(63) Continuation of application No. 10/912,306, filed on Aug. 5, 2004, now Pat. No. 7,636,676.

(51) Int. Cl.
*G06Q 30/00* (2006.01)
(52) U.S. Cl. ............... 705/26.4; 705/26.1; 705/27.1
(58) Field of Classification Search ............ 705/26, 705/27
See application file for complete search history.

(56) References Cited

U.S. PATENT DOCUMENTS

| | | |
|---|---|---|
| 2002/0073012 A1 | 6/2002 | Lowell et al. |
| 2003/0033260 A1 | 2/2003 | Yashiro et al. |
| 2004/0193517 A1 | 9/2004 | Abrams |

OTHER PUBLICATIONS

Autoplanet, "AutoPlant Signs Licensing Agreement With Motor Information Systems—AutoPlanet will provide car repair pricing information as part of its comprehensive online service", Business Wire, Dialog File 610 #00375581, Oct. 2, 2000, 2 pages.
Author Unknown, "An Online Diagnostic System for Consumers", Sep. 25, 2000, 2 pages.
Automotive Service Association, "News Briefs", AutoInc. Magazine, vol. XLVIII, Nov. 2000, 2 pages.
Baker, P., "E-commerce: Excellent in parts", Works Management, ProQuest Document ID 84543752, Oct. 2001, p. 30, 54(10).
Fixthiscar.com, "Fixthiscar.com Inks Licensing Agreement With Motor Information Systems for Data From Auto Repair Guides", Sep. 20, 2000, 2 pages, Fixthiscar.com, Pleasantville, New Jersey.
Hughes, S., "Interactive service is complete package; [01B Edition]", Evening Chronicle, ProQuest Document ID 379567921, Oct. 29, 2002, p. 6.
Sramcik, T., "Alaska introduces aftermarket parts bill", Automotive Body Repair News, ProQuest Document ID 124865191, Jun. 2002, p. 26, 6(26).
The Auto Channel, "Fixthiscar.com Announces Premier Online Marketplace for Automotive Repair Information", http://www.theautochannel.com/news/press/date/20000918/press025876.html, Sep. 18, 2000, 3 pages, Fixit4less.com, Inc., Pleasantville, New Jersey.

*Primary Examiner* — Robert M. Pond
(74) *Attorney, Agent, or Firm* — Standley Law Group LLP

(57) ABSTRACT

An Internet-based (web-based) system and method for allowing a vehicle owner to obtain a fair repair estimate for a vehicle. The system and method allows information relating to the vehicle to be repaired and the components of the vehicle to be repaired or replaced to be entered by the vehicle owner into the user interface of a repair estimating website. Geographic location information may also be provided to facilitate the preparation of a more accurate estimate. The system and method retrieves necessary information from one or more databases and provides the information to one or more software applications that are used to quickly generate an electronic repair estimate. Various options may be selected to customize the repair estimate and to allow for other actions.

10 Claims, 29 Drawing Sheets

VEHICLE INFORMATION

PLEASE ENTER INFORMATION REGARDING THE VEHICLE TO BE REPAIRED

VEHICLE IDENTIFICATION NUMBER (VIN)*

2C3HE66G8YH185440 — 120

*THE VIN CAN USUALLY BE FOUND:
- ON THE VEHICLE'S TITLE OR REGISTRATION;
- ON YOUR INSURANCE CARD OR POLICY;
- ON THE FRONT DRIVER'S SIDE DOOR POST; OR
- BY LOOKING THROUGH THE BOTTOM, DRIVER'S SIDE CORNER OF THE VEHICLE'S WINDSHIELD

OR

115

*YEAR yyyy
*MAKE Select A Make
*MODEL Select A Model
*ENGINE Select
*TRANSMISSION Select
COLOR

* REQUIRED FIELDS

HELP — 125

REPAIR INFORMATION

PLEASE ENTER A PART NUMBER(S)

| Quantity |
|---|

PART NO. 1  4792195
PART NO. 2
PART NO. 3
PART NO. 4
PART NO. 5
PART NO. 6

COMPONENT OPTIONS

WOULD YOU ALSO LIKE TO SEE A REPAIR ESTIMATE USING ANY OF THE FOLLOWING TYPES OF COMPONENTS?

Check Box if "Yes"

☑ — 260  Remanufactured Components

☑ — 265  Used Components

☑ — 270  Non-OEM Components

REPAIR LOCATION

BY PROVIDING THE GEOGRAPHIC LOCATION OF THE REPAIR, YOUR ESTIMATE WILL BE MORE ACCURATE

Please Enter The Zip Code Where The Repair Will Take Place

ZIP CODE: 43017 — 280

ESTIMATE

2000 CHRYSLER 300M; 4 DR SEDAN; 3.5L V6; 4-SPEED AUTOMATIC TRANSMISSION

PARTS*

| QUANTITY | DESCRIPTION | PART COST |
|---|---|---|
| 2 | Brake Pad (Front) | $111.00 |
| 2 | Brake Pad (rear) | $102.00 |
| 2 | Brake Rotor/Disc (front) | $114.00 |
| 1 | Radiator Hose (upper) | $15.70 |
| 2 | Radiator Hose Clamp | $3.20 |
| 1 | Water Pump | $97.60 |
| 1 | Coolant | $10.49 |
| | | $453.99 |

*OEM PARTS ONLY

LABOR

| DESCRIPTION | LABOR TIME (hrs.) |
|---|---|
| Replace Brake Pads (Front) | 0.8 |
| Replace Brake Pads (rear) | 0.8 |
| Replace Brake Rotors/Discs (front) | 0.4 |
| Replace Radiator Hose (upper) | 1.6 |
| Replace Water Pump | 3.0 |
| | 6.6 |

THE AVERAGE LABOR RATE FOR ZIP CODE  43017  IS $70.00/HR.

YOUR TOTAL ESTIMATED FAIR REPAIR COST IS  $915.99

ESTIMATE

2000 CHRYSLER 300M; 4 DR SEDAN; 3.5L V6; 4-SPEED AUTOMATIC TRANSMISSION

PARTS

| QTY. | DESCRIPTION | OEM PART COST[1] | Non-OEM PART COST[2] | REMFD. PART COST[3] | USED PART COST[4] |
|---|---|---|---|---|---|
| 2 | Brake Pad (Front) | $111.00 | $61.49 | N/A | N/A |
| 2 | Brake Pad (rear) | $102.00 | $41.99 | N/A | N/A |
| 2 | Brake Rotor/Disc (front) | $114.00 | $75.98 | N/A | N/A |
| 1 | Radiator Hose (upper) | $15.70 | $18.99 | N/A | N/A |
| 2 | Radiator Hose Clamp | $3.20 | $2.20 | N/A | N/A |
| 1 | Water Pump | $97.60 | $59.99 | $37.99 | $32.50 |
| 1 | Engine Coolant | $10.49 | $7.39 | N/A | N/A |
| | | $453.99 | $268.03 | $394.38* | $388.89* |

* OEM part costs have been substituted for all non-available parts. You may be able to substitute other available part costs to achieve a lower overall part cost.

LABOR

| DESCRIPTION | LABOR TIME (hrs.) |
|---|---|
| Replace Brake Pads (Front) | 0.8 |
| Replace Brake Pads (rear) | 0.8 |
| Replace Brake Rotors/Discs (front) | 0.4 |
| Replace Radiator Hose (upper) | 1.6 |
| Replace Water Pump | 3.0 |
| | 6.6 |

THE AVERAGE LABOR RATE FOR ZIP CODE  43017
IS: $70.00/HR.

*YOUR TOTAL ESTIMATED FAIR REPAIR COST FOR EACH OF THE ABOVE REPAIR TYPES IS SHOWN IN RED, BELOW:*

LOCAL REPAIR FACILITIES

THE FOLLOWING REPAIR FACILITIES ARE NEAR YOUR AREA

| REPAIR FACILITY | LOCATION |
|---|---|
| A1 Car Care | 829 Frantz Road, Dublin, OH |
| Abo's Car Repair * | 4772 Lane Ave., Columbus, OH |
| Auto Allies | 863 W. Olentangy St., Powell, OH |
| Bob's Auto Service | 520 Parkway Ln., Hilliard, OH |
| Carl's Garage | 912 Dublin Rd., Dublin, OH |
| EMG Pro Service * | 6366 W. 5th Ave., Columbus, OH |
| Frank's Car Kennel | 473 Roberts Rd., Columbus, OH |
| Kurt's Auto Repair * | 3 Perimeter Loop Dr., Dublin, OH |
| M's Auto Service * | 123 St. Rt. 23 N, Delaware, OH |
| Pro Auto Care * | 6528 Sawmill Rd., Columbus, OH |
| RC's Auto Emporium * | 411 Louise Ave., Powell, OH |

* Denotes a repair facility that has agreed to honor estimates from FAIRREPAIR.COM

SELECT A REPAIR FACILITY AND CLICK ON "CONTINUE" FOR MORE INFORMATION

SYSTEM AND METHOD FOR ALLOWING A VEHICLE OWNER TO OBTAIN A VEHICLE REPAIR ESTIMATE

CROSS-REFERENCES TO RELATED APPLICATIONS

This application is a continuation of U.S. patent application Ser. No. 10/912,306, filed Aug. 5, 2004, titled System And Method For Allowing A Vehicle Owner To Obtain A Vehicle Repair Estimate, now U.S. Pat. No. 7,636,676, issued Dec. 22, 2009, which is incorporated herein by reference.

FIELD OF THE INVENTION

The present invention relates to a system and method for allowing a user, such as a vehicle owner, to obtain a vehicle repair estimate. More particularly, the system and method of the present invention is directed to an interactive system and method for providing an accurate vehicle repair estimate to a user of the system, especially to a user that is not knowledgeable in the area of vehicle repair. Even more particularly, the present invention is directed to an interactive system and method for providing to a vehicle owner a vehicle repair estimate involving the servicing and/or replacement of one or more mechanical, electrical, hydraulic, or similar vehicle components or systems.

BACKGROUND AND SUMMARY OF THE INVENTION

It is well known that there are an enormous number of vehicles being repaired on a daily basis. The vast majority of these vehicles consist of passenger vehicles, such as automobiles, pickup trucks, sport utility vehicles (SUV's) and minivans. However, for purposes of the present invention, repairs made to other vehicles, such as delivery vans/trucks and motorcycles may also be considered relevant.

When a vehicle must be repaired, the repair may, or may not, be covered by a warranty on the vehicle. Thus, it is typically first determined whether the vehicle is still under warranty and, if so, what components are covered thereby. For example, it is now common for manufacturers to apply warranties of different length to different components or systems of a vehicle (e.g., drivetrain vs. emission controls). If a repair is fully covered by a warranty, the cost of the repair is generally of no concern to the vehicle owner, lessee, or other party responsible for or interested in the vehicle (all of which are hereinafter considered to be a "vehicle owner" for purposes of the present invention), because the repair will be paid for by the vehicle manufacturer or an insurance carrier. However, if the entire warranty on a vehicle in need of repair has expired, or if the particular component(s) in need of repair or replacement is no longer covered by the warranty, the cost of the repair is of much greater interest to the vehicle owner—as, in this situation, it is the vehicle owner that will likely pay for the repair.

The problem with the latter of the above-described situations is that a typical vehicle owner has little or no idea what a particular vehicle repair should cost. Even with simple repairs, there may be component purchase costs, component disposal costs, removal and installation charges, and several other possible expenses that may be incurred by the vehicle owner. With more complex repairs, which are not necessarily unusual with respect to today's more complex vehicles, the explanation of repairs and their associated costs may perplex even knowledgeable vehicle enthusiasts.

In this situation, the vehicle owner is left substantially at the mercy of the vehicle dealer or other repair facility to which the ailing vehicle has been taken. The vehicle owner must trust that the repair facility will quote an honest and fair cost for the work to be done. Unfortunately, while the vast majority of vehicle repair facilities are likely honest and do quality work, there are inevitably those that do not. In addition, even substantially honest repair facilities often make money by adding a service, delivery, or some other aptly-named charge to the cost of replacement components, and/or by taking more than a manufacturer-determined amount of time to complete a repair.

It is for this very reason that insurance companies in the business of insuring vehicles typically maintain or make use of a database of repair costs. By doing so, the insurance companies can ensure that when a claim is called in by a repair facility, the amount paid in regard thereto will be fair in light of other similar claims.

Thus, when an insurance company is asked by a repair facility to pay for a completed vehicle repair, or to authorize the undertaking of a vehicle repair, the insurance company will typically be armed with a considerable amount of information that can be used to determine if the request is fair. A typical vehicle owner does not have this luxury. Instead, a typical vehicle owner, who will generally have less knowledge about the vehicle to be repaired than an insurance adjuster even without a database of information, must rely on the repair facility to be honest in the estimate that it provides.

In addition to forced reliance on the honesty of a vehicle repair facility, an owner of a vehicle in need of repair may be in the somewhat unique position of not being able to obtain more than one repair estimate, or to otherwise shop around for a better deal. While in some situations this may not be the case, there are many repair scenarios wherein the vehicle to be repaired cannot, or should not, be driven to another repair facility. Certainly, there are those situations where the vehicle in need of repair cannot even be driven to a repair facility under its own power. In such situations, the vehicle owner is not in a position to obtain multiple estimates which can then be compared. Rather, the vehicle owner will likely be forced to pay the repair amount quoted by a single repair facility, or face the danger or towing expenses involved in transporting the vehicle to another repair facility. And, even if an additional estimate(s) is sought out, there is no guarantee that another repair facility will be able to complete the repair in question any less expensively.

Unfortunately, another downside to obtaining only one estimate (aside from forced reliance on the integrity of the repair facility in question) is that many repair shops, even in those in general proximity to one another, often charge different amounts for the same repair. This can be attributed to several factors. For example, dealer repair facilities often charge more for a given repair than a locally owned or small chain-type repair facility. And, even dealers within a similar geographic area may quote different amounts for the same repair. Some dealers simply charge more than others; whether it be because they are more upscale, offer more services to their customers, or generally have just earned a reputation for performing good work. Dealers may also add varying delivery or other charges to the cost of replacement components. These same discrepancies often hold true for non-dealer repair facilities as well. Consequently, in many circumstances, it may be beneficial for a vehicle owner to obtain more than one repair estimate—even if from repair facilities in close proximity to one another.

Since, as stated above, this is often not possible, or practical for that matter, the alternative would be for a vehicle owner to have access to repair information that could be used to determine a fair cost for a given vehicle repair. Unfortunately, very few vehicle owners have access to such information and, even if they did, might not be able to adequately use the information to determine a fair repair cost. There are no books, databases or other sources of such information to which the average vehicle owner has access. Additionally, determining the overall cost of a repair, even with access to such information is not necessarily an easy task. While the advent of computers and databases has made the process of providing a repair estimate look fairly undaunting, the fact is that the process can be quite complex—especially for vehicle owners with little understanding of their vehicle, or of vehicles in general. Thus, even armed with a detailed estimate and with access to a database(s), an average vehicle owner may find it difficult, if not impossible, to determine a fair repair cost.

Consequently, what is needed by the average vehicle owner and, to Applicant's knowledge has been heretofore unavailable, is a system and method by which a vehicle owner can obtain a repair estimate, and/or check the fairness of a repair estimate, with only limited knowledge regarding the vehicle to be repaired. The system and method of the present invention satisfies this need.

The system and method of the present invention provides a means by which an average vehicle owner can obtain and/or check the fairness of a repair estimate, even if the vehicle owner has little or virtually no knowledge regarding the specifics of the vehicle to be repaired. The system and method of the present invention also provides a means by which a knowledgeable vehicle owner can generate a repair estimate by entering more detailed information about the vehicle and the needed repair. An initial repair estimate can be generated, or an existing repair estimate can be checked, quickly and from virtually any location.

In one embodiment of the present invention, the vehicle owner calls a telephone number and provides the necessary information to a service representative who, using a database(s) of repair information, provides an estimate that is specific to the owner's vehicle, the repair to be performed and, preferably, the owner's geographical location. In another embodiment of the present invention, the vehicle owner calls a telephone number and is connected to an automated, voice-prompted system, that allows the owner to enter the necessary vehicle information, repair information and, optionally, location information, using the telephone. The system will thereafter automatically calculate and present the owner with an estimate. In either case, multiple estimates may be provided based on criteria selected by the vehicle owner (as will be described in more detail below).

In a more preferred (Internet-based) embodiment of the present invention, however, the vehicle owner is able to generate a first estimate or a comparison estimate by providing certain information through a user interface resident at an Internet website. In this manner, a vehicle owner can efficiently and conveniently obtain a repair estimate at any time and from any location having Internet access. Mobile telecommunications, such as wireless Internet compatible laptop and handheld computers, for example, can even allow the vehicle owner to obtain a comparison repair estimate without leaving a repair facility from which an initial estimate was received.

With respect to preparing a comparison estimate, the system and method of the present invention requires that the vehicle owner have only minimal personal knowledge regarding details of the vehicle to be repaired or the repair to be made thereto. As the vehicle owner will already have a detailed repair estimate, or can request a detailed repair estimate from the repair facility providing the estimate, specific repair information (e.g., components) can be obtained therefrom and input to the system. Other information required by the system and method of the present invention may include, for example, information necessary to identify the person requesting the estimate, the method of paying for the estimate, the identity of the vehicle and, preferably, the geographic location where the repair will take place. The vehicle identifying information may include, for example, the year, make and model of the vehicle, as well as engine and/or transmission information. Alternatively, the aforementioned service representative, automated telephone system, or user interface of the website, may allow the vehicle owner to simply provide the vehicle identification number (VIN) that is associated with the vehicle and typically located on a tag viewable through a corner of its windshield. In this case, the vehicle can be identified without requiring any additional information from the vehicle owner. It is also preferred, but not necessary, that the geographic location of the vehicle be provided so that the generated estimate accurately reflects average local labor rates and/or other factors that may effect the repair cost. This information may be provided in the form of a zip code, a city and state, a country and city, or any number of other ways that would be understood by one skilled in the art.

With respect to the Internet-based embodiment of the system and method of the present invention, a vehicle owner accesses the user interface by using a browser to connect to the website. The user interface may prompt the vehicle owner for initial information such as, for purposes of illustration only and not in a particular order, personal information or some other identifier by which the estimate can be referenced, credit card and related billing information to allow for payment for the estimate, vehicle identifying information, and the geographic location where the repair is to take place. The user interface may further query the vehicle owner as to whether an estimate(s) should also be generated using, in addition to original equipment manufacturer (OEM) components, aftermarket, remanufactured, and/or used components—if such components are available. Various other types of information may also be requested or provided, and the information may be requested or provided in any order. For example, the user interface may not allow vehicle information to be input until payment information is provided. Alternatively, the system and method may allow for vehicle information to be entered prior to supplying payment information to assure the vehicle owner that data on the particular vehicle is available. It is also possible for the system to allow a vehicle owner to enter all of the information required to generate an estimate before requiring the vehicle owner to enter payment information. Obviously, the specific operations performed by the user interface and the order in which the operations can occur may vary considerably, and all are considered to be within the scope of the present invention.

In one exemplary embodiment of the present invention, once the requisite identifying information regarding the vehicle owner and the vehicle has been received, the system and method of the present invention proceeds to prompt, or to otherwise provide fields for entering information regarding the repair to be performed. In the case of the present invention, a "repair" may include the repair or replacement of a single component or of multiple components, as well as the labor associated therewith. Therefore, the user interface permits the vehicle owner to enter as much information as necessary to fully describe the repair to be performed, and to subsequently allow the system to obtain the additional data necessary to properly estimate the repair cost.

In an embodiment of the present invention wherein the vehicle owner desires a comparison estimate, component information may be obtained from the already existing repair estimate and input into the system. In an embodiment of the present invention wherein the vehicle owner desires an initial estimate, the component(s) to be replaced must be determined by the vehicle owner (or another party with sufficient knowledge to make such a determination). As such, the component information in this case must generally be entered without the aid of an existing estimate.

The component information may be input in a multitude of ways. For example, in perhaps the most simplistic and efficient manner, components to be replaced may be identified by established part number. Alternatively, components to be replaced may be selected from a parts list that may be arranged alphabetically and/or by vehicle system/subsystem (e.g., electrical, suspension, emissions, etc.), for example. In yet another embodiment, the user interface may assist the vehicle owner in entering the correct name of a component by continually reducing a listing of possible components as the vehicle owner enters additional alphanumeric characters—a technique that is well known in the art. A description of each component entered, and/or a photograph or drawing of the actual component or a representative component, may be displayed for the vehicle owner during this portion, or a later portion of the estimate preparation process.

Once the system has the information necessary to identify the vehicle and the component(s) to be replaced, the system proceeds to obtain the additional data necessary for preparation of the estimate. The additional data may include, for example, the cost of the specified component(s), information regarding the labor that is generally associated with repairing or replacing the specified component(s), the industry accepted average time necessary to repair or replace each component, and an average labor rate. In the case where the vehicle owner has specified the geographic location in which the repair will take place, the labor rate(s) used by the system will accurately reflect the average labor rate(s) of repair facilities in the area. In the case where the vehicle owner has not specified the geographic location in which the repair will take place, the labor rate(s) used by the system may reflect average labor rate(s) of repair facilities in the city or state of the vehicle owner's billing address, a national average labor rate, or virtually any other desired default labor rate(s). In any event, the system is preferably able to obtain much of the data for use in preparing the repair estimate without any input from the vehicle owner.

The additional data necessary for preparation of the repair estimate is preferably retrieved from one or more existing databases—although new databases may also be created for this purpose. The database(s) may reside on one or more data servers at a single location. Alternatively, the database(s) may reside on one or more data servers at more than one location. The database(s) may be the property of, or under the control of, a single entity, such as the owner of the present invention. Alternatively, the database(s) may be controlled by various entities. For example, one entity may control a database that allows for vehicle identification using only a VIN. Another entity may control a database that allows for the identification of components by part number. In the case of using database(s) owned by other entities (and on their servers), the system is designed to identify and access the proper database(s), and to retrieve the required data therefrom. The system may make use of one or more modules that allow it to interface with the necessary database(s) (and/or servers) and retrieve and/or convert the data for use in preparing the estimate. The entities having ownership/control of these database(s) may be compensated for providing the retrieved data, but such arrangements and methods need not be discussed in detail herein.

After all the necessary data has been retrieved, the system calculates a repair estimate. The repair estimate may be calculated by an appropriate software application, or collection of applications, resident on a web server, a data server, or a combination thereof. The repair estimate may then be presented to the vehicle owner in an infinite variety of formats. An Internet-based version (e.g., an HTML version) as well as a printer formatted version of the repair estimate may be made available to the vehicle owner.

As one option of the system and method of the present invention, the vehicle owner may be prompted or otherwise allowed to provide additional information or to select particular options that affect the form or content of the repair estimate. For example, if the vehicle owner is interested in the possibility of using aftermarket, remanufactured, and/or used components in addition to OEM components to effectuate the repair, the system may provide a checkbox or other means by which such interest can be indicated. The system output might then consist of multiple estimates corresponding to the particular type of component used, and possibly the source from which a component price was obtained. In such a case, individual estimates could be separately produced, or multiple estimates may be presented as part of a single output in order to simplify the comparison thereof.

As a further aspect of this option, one or more sources from which an aftermarket, remanufactured, and/or used component can be procured may be identified, along with the associated cost of the component. As an even further aspect of this option, a means may be provided to allow the vehicle owner to check on the availability of a component and/or to purchase the component online.

It is contemplated that merchants wishing to be identified by the system of the present invention might wish to pay for advertising space on the web server hosting the user interface, or to be otherwise mentioned as a component source. It is also contemplated that arrangements might be made with participating merchants to offer a discount to users of the system of the present invention whom opt to purchase aftermarket, remanufactured, and/or used components therefrom.

As another option of the present invention, arrangements may be made with one or a plurality of repair facilities in a given area to honor a repair estimate in consideration for being identified to a user of the system. For example, once an estimate is generated, the system may inquire as to whether the vehicle owner would like to be provided with a list of repair facilities in their area that will honor the estimate. If the answer is affirmative, a list of participating repair facilities and their contact information can be displayed or otherwise presented to the vehicle owner.

As yet another option of the present invention, the system may inquire as to whether the vehicle owner wishes to be provided with a list of all repair facilities in their area that are capable of performing the needed repair—regardless of whether the repair facilities have agreed to honor an estimate generated according to the present invention. If the vehicle owner answers affirmatively, a list of the various repair facilities and their contact information can be displayed or otherwise presented thereto. The repair facilities may be categorized in different ways, such as by their characterization as a dealership, a national repair chain or a local garage, or by whether they are authorized by the vehicle manufacturer to perform the needed repair. Repair facilities agreeing to honor an estimate generated by the present invention may also be identified within the potentially larger group of repair facilities.

As an additional option of the present invention, the system may allow the vehicle owner to schedule an appointment with a particular repair facility selected from one of the aforementioned repair facility lists. For example, the system of the present invention may provide a scheduling function that allows the vehicle owner to directly schedule an appointment. Alternatively, the system of the present invention may provide a link that allows the vehicle owner to access an online scheduling portion of a repair facility website, and to subsequently make an appointment. Scheduling of an appointment may also be facilitated by a service representative or an automated phone system when a vehicle owner chooses such a method of obtaining a repair estimate.

It should be understood that the various exemplary embodiments and options associated with a system and method of the present invention and described above, can generally be provided in some form whether the vehicle owner opts to obtain an estimate using an Internet-based, automated phone system-based, or service representative-staffed version of the present invention. For example, instead of displaying a list of repair facilities for viewing by the vehicle owner, a list of repair facilities may be audibly presented by an automated phone system-based or service representative-staffed version of the present invention.

Certain aspects and features of the present invention have been described above. However, a better understanding of the above-described system and method for proving a vehicle repair estimate can be attained through a reading of the following detailed description, wherein various exemplary embodiments are provided for the purpose of better illustrating the subject matter of the present invention.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein:

FIG. 4 illustrates an exemplary vehicle information gathering page of a website associated with a Internet-based system and method of the present invention;

FIG. 7 illustrates an exemplary repair information gathering page of a website associated with an Internet-based system and method of the present invention;

FIG. 11 illustrates an exemplary repair estimate options page of a website associated with an Internet-based system and method of the present invention;

FIG. 12 illustrates an exemplary location information gathering page of a website associated with an Internet-based system and method of the present invention;

FIG. 14 illustrates an exemplary repair estimate presentation page of a website associated with an Internet-based system and method of the present invention;

FIG. 15 illustrates an alternate embodiment of a repair estimate presentation page of a website associated with an Internet-based system and method of the present invention;

FIG. 17 illustrates an exemplary repair facility display page of a website associated with an Internet-based system and method of the present invention;

DETAILED DESCRIPTION OF THE EXEMPLARY EMBODIMENT(S)

Figure 1:
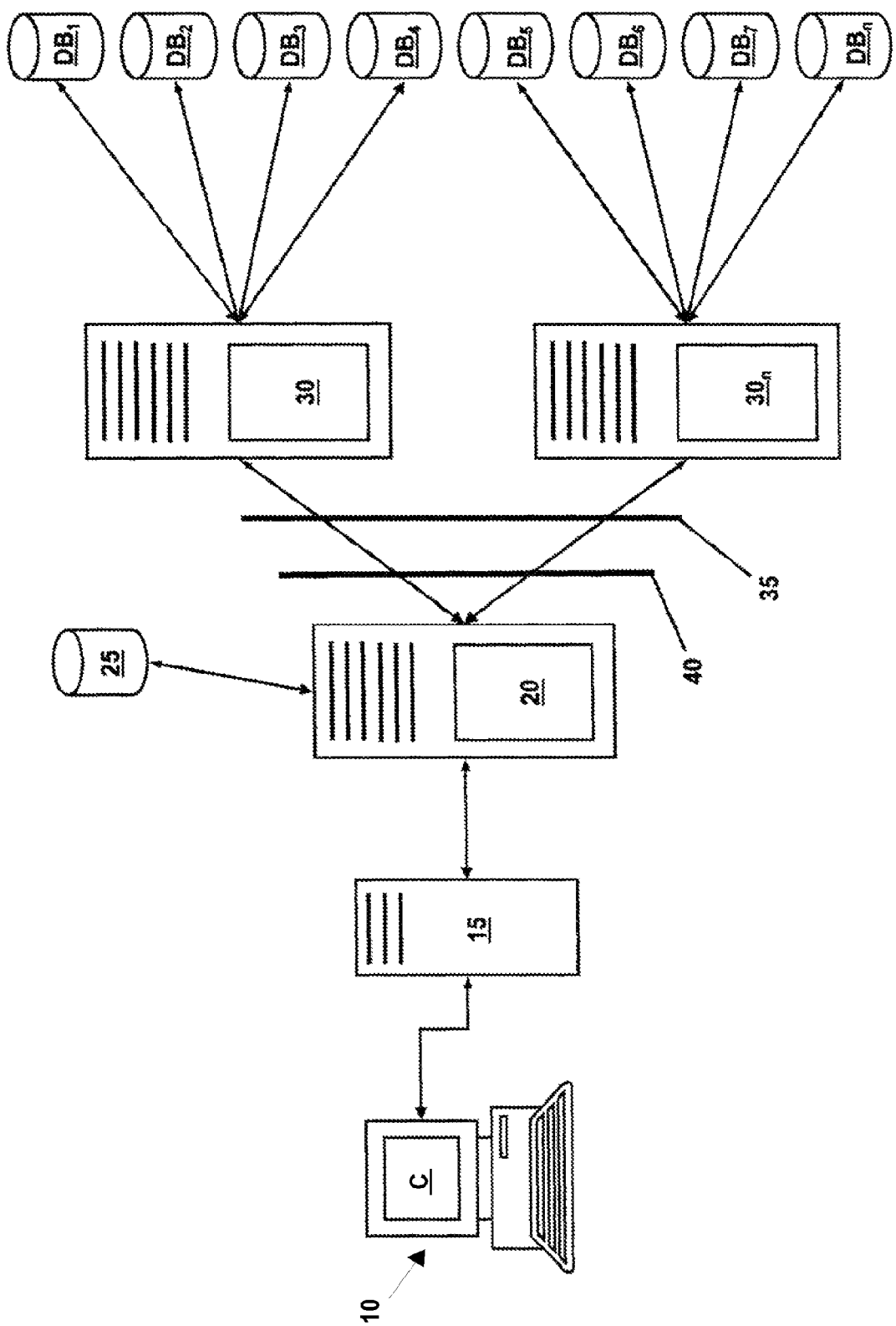
FIG. 1 is a block diagram representing the hardware components of one exemplary embodiment of a Internet-based repair estimate preparation system of the present invention.

As can be understood from the foregoing discussion, the system and method of the present invention provides a means by which a fair estimate for a vehicle repair can be obtained. While there is no limitation on who can use the present invention, it should be realized that the systems and methods described herein will be of most interest to those parties not knowledgeable in the area of vehicle repair. As such, the present invention is directed primarily to vehicle owners, as opposed to repair professionals (e.g., adjusters, etc.)—although such persons may also make use of the present invention. For purposes of the present invention, the term "vehicle owner" is also intended to include vehicle lessees, renters, and other parties that may be responsible for the repair of a vehicle.

Through use of the present invention, an average vehicle owner can quickly and cost effectively obtain a comparison repair estimate for a vehicle without having a detailed personal knowledge of the vehicle to be repaired or the nature of the problem therewith. The system and method of the present invention also allows a vehicle owner to obtain an initial repair estimate prior to taking the vehicle to a repair facility, by providing somewhat more detailed information regarding the vehicle and the repair to be performed. For purposes of simplicity with respect to the description of exemplary embodiments of the present invention presented below, "estimate" or "repair estimate" may include either, or both, types of aforementioned repair estimates.

In one embodiment of the system and method of the present invention, a repair estimate is generated using an Internet-based estimating system 5. As can be best observed by reference to the exemplary hardware schematic of FIG. 1, the system 5 preferably includes a user interface 10, which may be accessed from any computer, handheld, or other device that is loaded with a browser and is capable of connecting to the Internet. The user interface 10 may reside on one or more web pages of a website. The website is hosted on a web server 15. The web server 15 preferably also communicates with a data server, such as with a central data server 20, and/or with one or more remote data servers $30\text{-}30_n$.

The user interface 10 in this embodiment of the present invention may serve multiple purposes. For example, the user interface 10 may allow a user (vehicle owner, lessee, etc.) of the system 5 to enter information such as, among other things, vehicle information, repair information, geographical information, personal information, and payment information. The user interface 10 may also provide information to the vehicle owner. Such provided information may include, for example, information regarding the vehicle to be repaired, components to be repaired or replaced, labor related to the repair(s) to be performed, an estimate for the repair, and a list of repair facilities capable of performing the repair. Thus, the user interface 10 can be considered to include any web page, or portion of a web page, that allows a user to enter or receive information in any way related to obtaining the repair estimate.

In addition to communicating with the web server 15, the central data server 20 may host or otherwise be in contact with one or more databases $DB_1\text{-}DB_n$. The database(s) $DB_1\text{-}DB_n$ may be type specific, including without limitation: a vehicle identification database; a vehicle component database; a vehicle identification number (VIN) database; a labor time database; a labor rate database; a repair facility database; and a vehicle and/or component image database. Of course, a single database may contain more than one type of data.

In one embodiment of the present invention, all the databases $DB_1\text{-}DB_n$ may reside on the central data server 20 or on another individual data server in communication therewith. However, as shown in FIG. 1, the databases $DB_1\text{-}DB_n$, or a majority of the databases, will more typically reside on multiple data servers $30\text{-}30_n$ that may be accessed by the central data server 20; preferably through a firewall 35. More than one type of database $DB_1\text{-}DB_n$ may be resident on a single data server $30\text{-}30_n$. When multiple data servers $30_1\text{-}30_n$ are involved, the data servers may reside at a single location, or may reside at several locations. In a similar manner, the databases $DB_1\text{-}DB_n$ and/or the data servers 20, $30\text{-}30_n$ on which they reside may be owned or controlled by a single entity. Alternatively, the databases $DB_1\text{-}DB_n$ and/or the data servers 20, $30\text{-}30_n$ on which they reside may be owned or controlled by multiple entities. For example, all or certain of the databases $DB_1\text{-}DB_n$ and their corresponding data servers $30\text{-}30_n$ may be owned by an entity, or entities, other than the owner of the system 5, in which case the databases may be accessed and have information retrieved therefrom by the central data server 20 for a fee, or under some other arrangement. In this manner, it is not required that a single entity own or control all of the data that may be required to calculate the repair estimate.

Aside from one or more databases $DB_1\text{-}DB_n$ containing the data necessary to calculate the actual repair estimate, the system 5 of the present invention may also include a user database 25. The user database 25, like the other databases $DB_1\text{-}DB_n$, may reside on the central data server 20, or on another server $30\text{-}30_n$ in communication therewith. The user database 25 may store personal information entered by the user. The personal information may be used to prepare and/or personalize the repair estimate, may be used during payment for the repair estimate, and may be stored for later retrieval should the same user wish to obtain another repair estimate. The personal information may also be saved along with a completed repair estimate so that a user can return to the website and review the estimate. It should be realized that the user database 25 is optional, and is not essential to the preparation of a repair estimate.

The system 5 of the present invention may employ one or more estimating software applications to calculate the repair estimate based on the information retrieved from the databases $DB_1\text{-}DB_n$. The software application(s) may reside on the web server 15, on the central data server 20, or on a combination thereof. The system 5 may also include an optional data interface 40 (e.g., one or more programs or modules) to effectuate communication and/or data retrieval from the databases $DB_1\text{-}DB_n$; particularly if the database(s) are owned or controlled by different entities. One skilled in the art would understand how to provide for the necessary communication, data retrieval, and/or data conversion that may be necessary to allow the estimating software to obtain the required data and to prepare the repair estimate, and such need not be described in detail herein.

Figure 2:
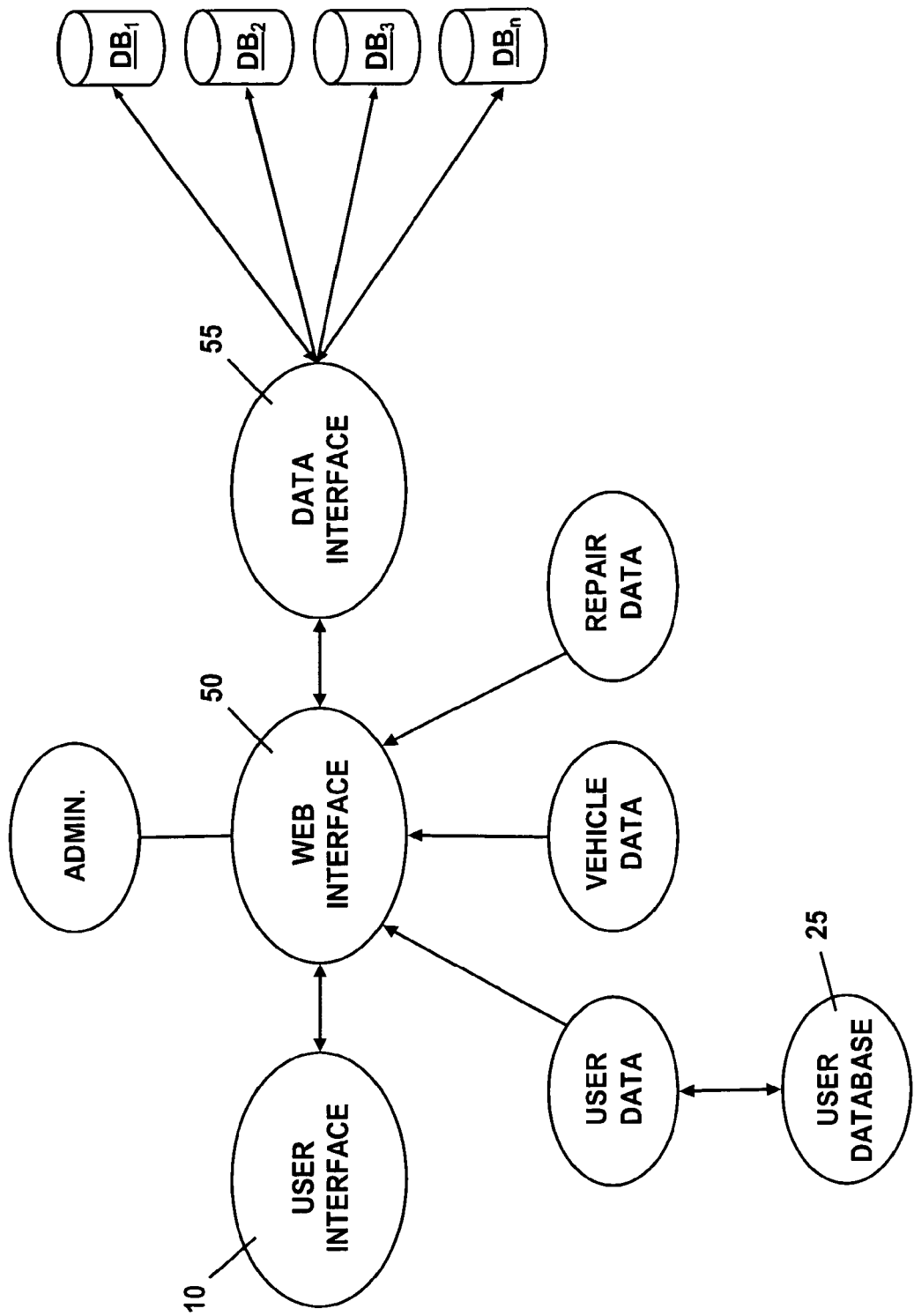
FIG. 2 is a software application data flow diagram for an exemplary embodiment of a Internet-based system and method of the present invention.

The interactions between the various hardware components of the system 5 of FIG. 1 can be better understood by reference to FIG. 2. As illustrated, the user interface 10 handles all interactions between the system 5 and a user thereof. For example, when a user first accesses the website with which the user interface 10 is associated, the user may be presented with an optional landing page 100 (see FIG. 3). The landing page 100 may explain the process of obtaining a repair estimate and the cost associated therewith. In any event, the user will eventually be directed to a web page where the user can begin to provide the data requisite to obtaining the repair estimate.

A web interface 50, resident on the web server 15, is in communication with the user interface 10 and is responsible for interactions between the user and the website. For example, the web interface 50 is responsible for presenting the correct web pages of the website to the user, such as in response to user selections or data input. The web interface 50 may also be responsible for collecting user data and for optionally sending the user data to the aforementioned user database 25. Similarly, the web interface 50 may manage entered vehicle and/or repair data and optionally save it to a respective database. The web interface 50 may also be responsible for various administrative tasks, such as presenting payment options, accepting payment information, and verifying that a payment has been accepted. The web interface 50 is also preferably in communication with a data interface 55 of the central data server 20.

The data interface 55 essentially manages requests for data that are received from the web interface 50 as a result of selections or inputs to the user interface 10 in communication therewith. The data interface 55 is responsible for tasks such as analyzing data requests, locating requested data, retrieving requested data from the appropriate database(s), and providing the data to the appropriate software application(s). The data interface 55 may also be responsible for converting the format of the retrieved data if it is not compatible with the software application(s).

One method of obtaining a repair estimate using the system of FIGS. 1-2 is depicted in the exemplary web pages of FIGS. 3-23. It should be realized, however, that the method of FIGS. 3-23 is shown for purposes of illustration only, as is not meant to limit the method of the present invention to the steps, or the order of the steps, shown therein. Rather, it is possible to request or present information from/to a user of the present invention in virtually any order, and in virtually any format. For example, vehicle and/or personal information may be requested before or after payment information is requested and submitted. Further, certain of the web pages illustrated in FIGS. 3-23 may not be used in other embodiments of the present invention, and additional web pages may be employed in yet other embodiments of the present invention.

Figure 3:
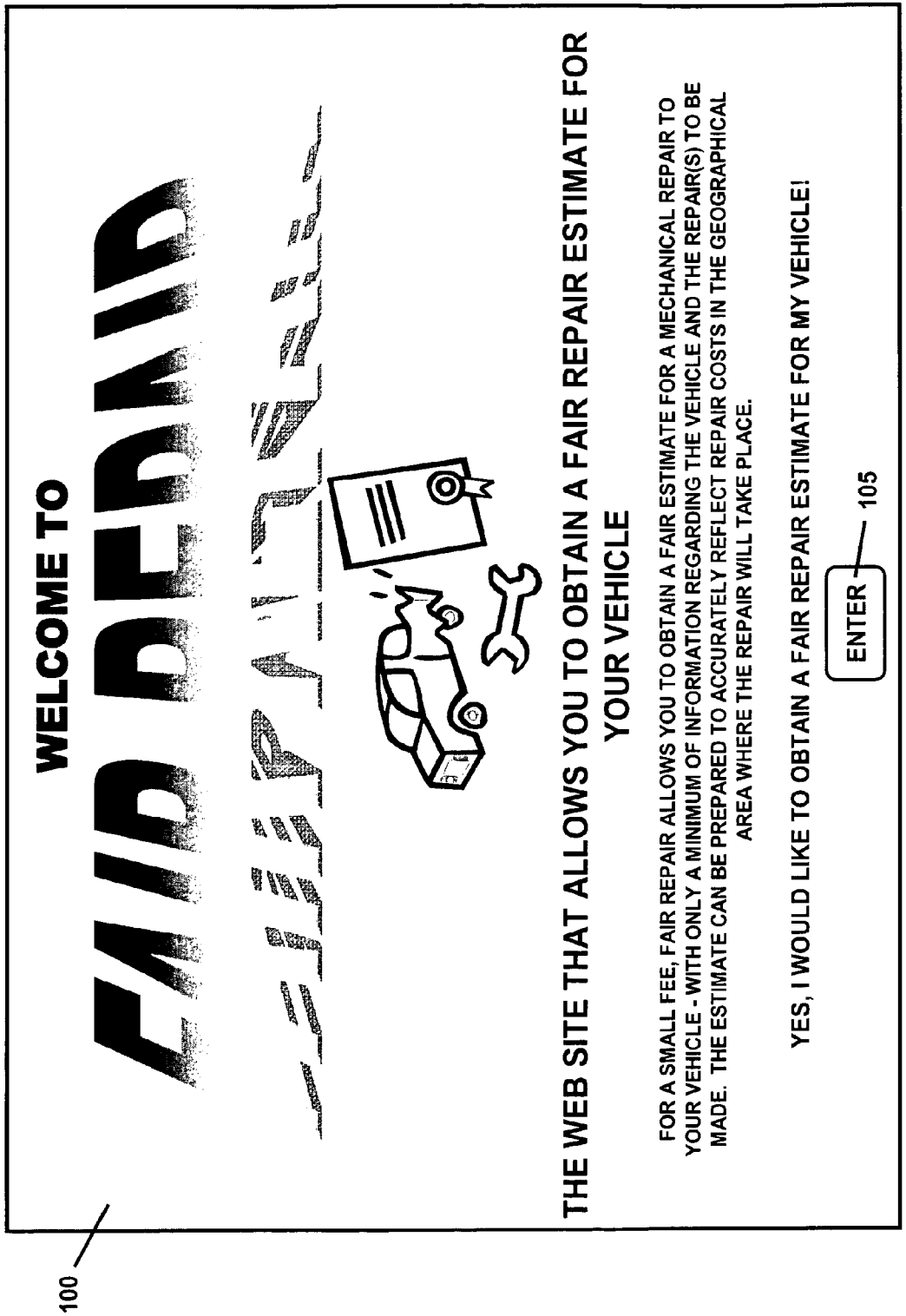
FIG. 3 illustrates an exemplary landing page of a website associated with a Internet-based system and method of the present invention.
Figure 5:
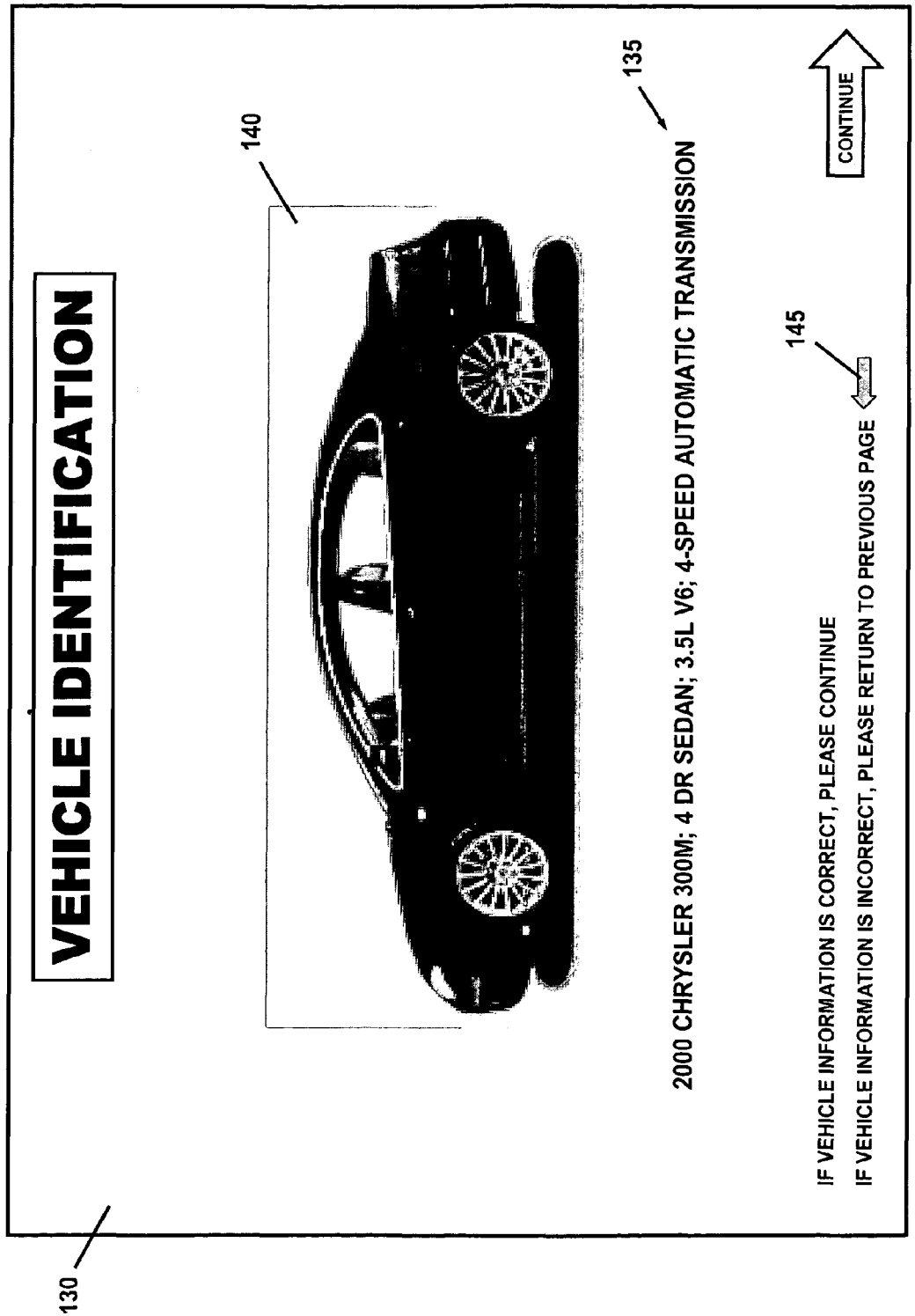
FIG. 5 illustrates an exemplary vehicle identification page of a website associated with a Internet-based system and method of the present invention.

With respect to operation of the present invention, it is to be understood that the user interface may simply provide fields or other means for allowing the user to provide necessary information or, alternatively, may prompt the user to enter particular information. As depicted in FIG. 3, upon accessing a website associated with the system and method of the present invention, a user may be presented with a landing page 100. The particular landing page 100 depicted in FIG. 3 identifies the website to the user, and provides the user with a brief explanation of the services offered through the website. Certainly, a lesser or greater amount of information could be provided on the landing page 100. For example, the cost of obtaining a repair estimate may be given. A means, such as the "enter" button 105 shown is preferably provided to allow the user to proceed with the estimate preparation process if the user so chooses.

In this particular embodiment of the present invention, a user that has elected to proceed with the estimate preparation process is directed from the landing page 100 to a new web page, or another portion of the current web page, where information regarding the vehicle to be repaired can be entered. An example of such a vehicle information gathering page 110 can be seen in FIG. 4. The vehicle information gathering page 110 is provided to procure from the user the vehicle information necessary to preparing a repair estimate.

Vehicle information may be collected in various ways. Two specific methods of providing the requisite vehicle information are demonstrated in FIG. 4. In the first method, fields 115 may be provided for allowing the user to enter the year, make, and model of the vehicle to be repaired. Additional fields may also be provided, such as, for example, to allow for the input of engine specifics and transmission type. The system may also allow the user to enter information that is not essential to the repair, but may be used to create a more personalized estimate. For example, the user may be allowed to enter the vehicle's color, which may be subsequently used to present an accurate image of the vehicle once it has been fully identified.

As an alternative to providing vehicle information as described above, which requires at least a basic knowledge of the vehicle to be repaired, this embodiment of the present invention also allows the user to enter only the VIN number 120 associated with the vehicle. The system 5 may then access a database of VIN's from which detailed information about the vehicle may be obtained. The VIN database may be owned by the owner of the system of the present invention. Alternatively, the VIN database may be owned by a separate entity and accessed by the system of the present invention.

If the user is unable to enter the requisite information by either of the illustrated methods (or by another method not shown in this example), assistance may be optionally provided by means of a "help" button 125, or by some similar action button or link. Preferably, a user requesting help is provided with additional information and/or questions that can help in identifying the vehicle to be repaired. It is contemplated that assistance may be provided on another page of the website, by directing the user to another website, or through any of various other acceptable methods.

Once the requisite vehicle information has been entered on the vehicle information gathering page 110, the system may display a confirmation of the vehicle identification based thereon, and/or may retrieve additional vehicle data from a vehicle database. In this particular embodiment of the system and method of the present invention, a user that has provided the requisite vehicle information is directed to a vehicle identification page 130, an example of which can be observed in FIG. 5. The vehicle identification page 130 preferably provides detailed information 135 regarding the vehicle, such as, for example, the year, make, model, engine designation, transmission type, and any of various other available information. The particular vehicle identification page 130 shown in FIG. 5 also provides the user with an image 140 of the vehicle to be repaired. If the user has responded to the vehicle color query on the vehicle information gathering page 110, the image 140 may accurately reflect the appearance of the user's vehicle. Otherwise, a default vehicle color may be selected. If an exact image of the identified vehicle is not available, a likeness may be presented. It is also possible to provide the user with a vehicle identification page 130 that does not employ an image. In any event, it is preferred, but not essential, that a vehicle identification page of some type be displayed for review by the user.

It is also preferred that the vehicle identification page 130 allow the user to amend the vehicle information should the resulting vehicle identification be incorrect. Preferably, a means 145, such as the "return" arrow shown, is provided to permit the user to return to the vehicle information gathering page 110 and amend the vehicle identifying information if necessary. Alternatively, of course, it may be possible to employ some other mechanism to permit information correction, or to simply make use of the web browser's "back" button to return to the proper web page.

Figure 6:
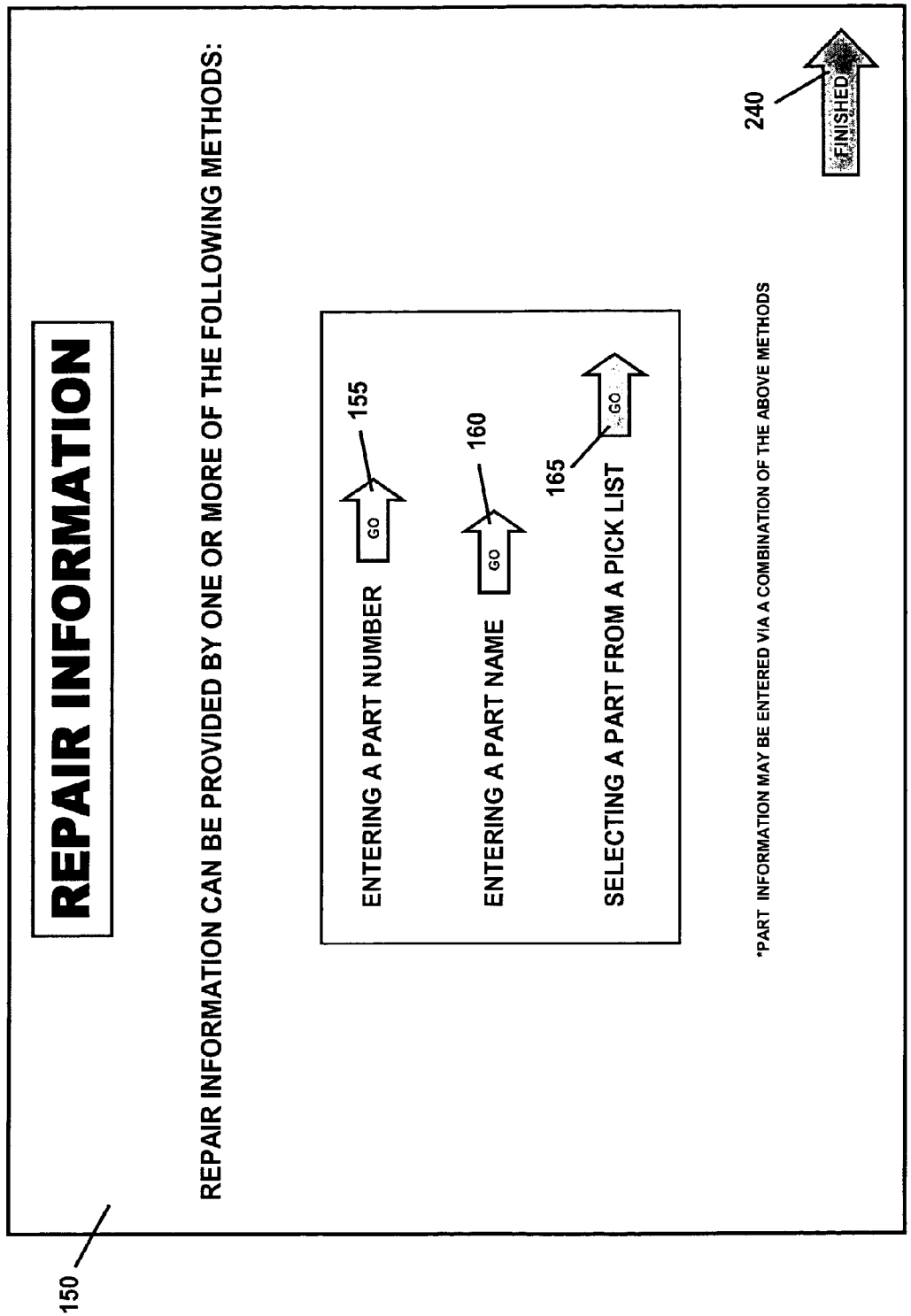
FIG. 6 illustrates an exemplary repair information directing page of a website associated with a Internet-based system and method of the present invention.

Upon proper confirmation of the vehicle's identity, information regarding the repair(s) to be made thereto is requested. Again, this information may be entered on separate web pages, or on different portions of the same web page. In this particular embodiment of the present invention, the user interface 10 allows a user to enter information regarding a component(s) to be repaired or replaced in several ways. To this end, the user is next transferred to a repair information directing page 150, such as is depicted in FIG. 6, where the user can select from one of several methods by which information regarding a component(s) to be repaired can be entered.

In a most direct manner, the repair information directing page 150 provides the user with the option of entering component information via part number 155. For example, a user having an existing repair estimate with a part number listed thereon, may elect to enter component information in this manner. When this option is selected on the repair information directing page 150, this particular embodiment of the present invention directs the user to a part number-based repair information gathering page 175, an example of which is illustrated in FIG. 7. As shown, the part number-based repair information gathering page 175 provides multiple fields 180 that permit the user to enter part numbers associated with one or more vehicle components to be repaired or replaced. Preferably, the part number-based repair information gathering page 175 further allows the user to enter the quantity 185 associated with each part number, although the quantity may also be supplied at a later time.

When a component the part-number(s) is supplied by the user, the system accesses a database of part numbers from which the component(s) to be repaired or replaced can be identified and information related thereto may be obtained. The part number database may be owned by the owner of the system of the present invention. Alternatively, the part number database may be owned by a separate entity and accessed by the system of the present invention.

Figure 8:
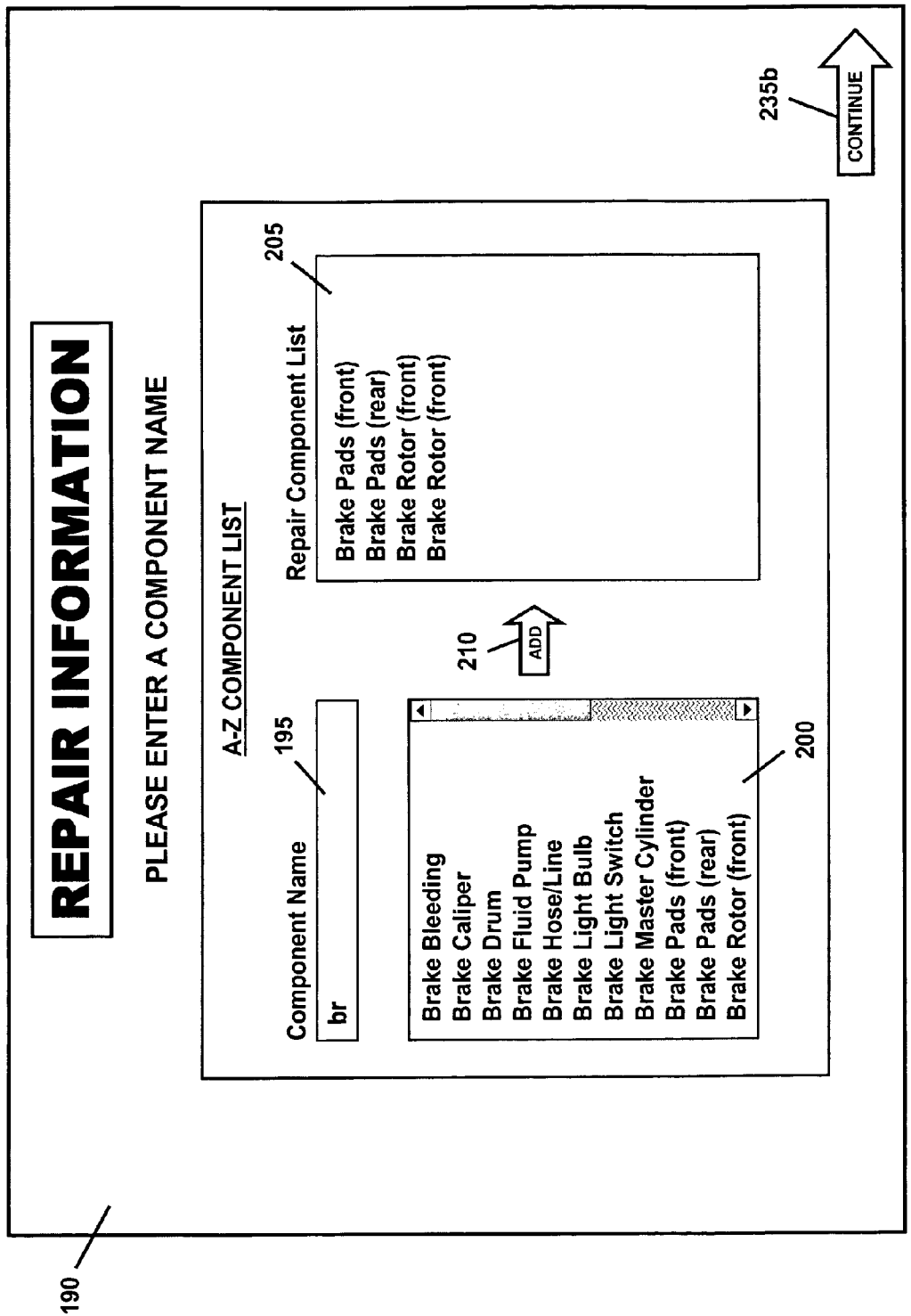
FIG. 8 illustrates another exemplary repair information gathering page of a website associated with an Internet-based system and method of the present invention.

In an alternative method of component identification, the repair information directing page 150 provides the user with the option of entering component information via component name 160. When this option is selected on the repair information directing page 150, this particular embodiment of the present invention directs the user to a part name-based repair information gathering page 190, an example of which is illustrated in FIG. 8. As shown, the part name-based repair information gathering page 190 provides a field 195 wherein the user can enter a component name, or at least a portion thereof. The system may then compare the entered component to a like-named list of components corresponding to the vehicle to be repaired. If the entered component matches only a single component on the list, the system may display that component and select the component for use in calculating the estimate. If more than one component contains the text entered by the user, the system may display a matching component list 200 from which the user may select the correct component. The part name-based repair information gathering page 190 may also employ an auto-matching algorithm, whereby the matching component list 200 is continually narrowed as additional characters are entered by the user. Upon completing the entry, or observing the display of the appropriate component(s), the user can select the component(s) from the list 200. In any case, once the user selects the correct component(s) from the matching component list 200, the component(s) is added to the repair component list 205, which will be used to prepare the repair estimate.

Preferably, the part name-based repair information gathering page 190 also allows the user to enter the required quantity of each component to be repaired or replaced, although the quantity can also be supplied at a later time. In this particular embodiment of the present invention, the proper quantity of each component can be submitted by selecting the appropriate component name from the list 200 and using the "add" arrow 210 to transfer the proper number of the component to the repair component list 205. Obviously, the quantity associated with each component could also be entered in a variety of other ways, all of which are considered within the scope of the present invention.

When a component name is supplied by the user, the system accesses a database of part names from which the component(s) to be repaired or replaced can be identified and information related thereto may be obtained. The component name database may be owned by the owner of the system of the present invention. Alternatively, the component name database may be owned by a separate entity and accessed by the system of the present invention.

Figure 9:
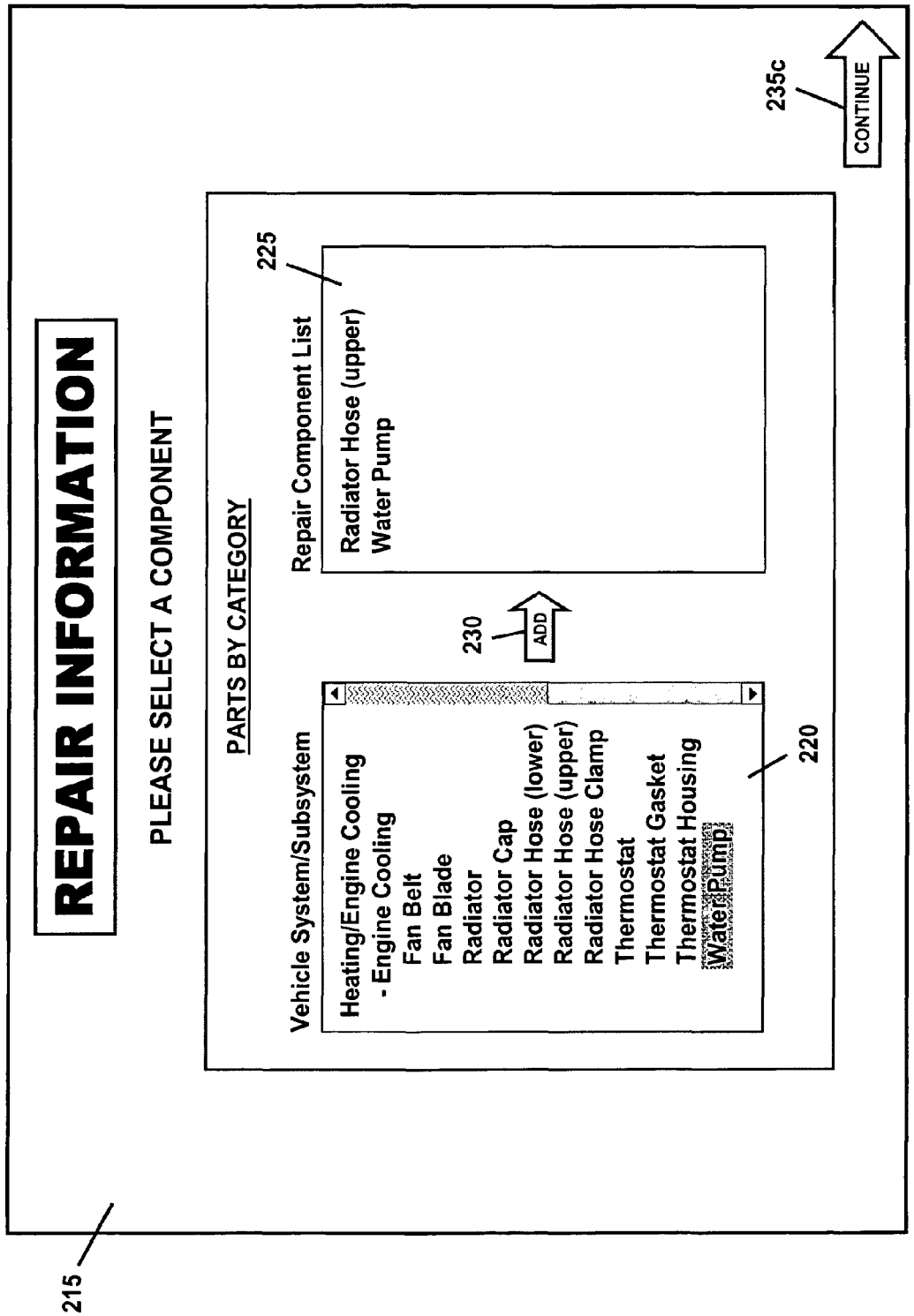
FIG. 9 illustrates yet another exemplary repair information gathering page of a website associated with an Internet-based system and method of the present invention.

In yet another method of component identification, the repair information directing page 150 provides the user with the option of selecting the component(s) to be repaired or replaced from a categorized list of vehicle components. When this option 165 is selected on the repair information directing page 150, this particular embodiment of the present invention directs the user to a category-based repair information gathering page 215, an example of which is illustrated in FIG. 9. The components in the categorized list 220 may be sorted in various ways, such as alphabetically. As shown in FIG. 9, the components may be further categorized, such as by the particular vehicle system or subsystem to which they belong. For example, to select a radiator hose, a user selects "Heating/Cooling" as the vehicle system and "Engine Cooling" as the vehicle subsystem. The system then displays a categorized list of components 220 associated with the vehicle's engine cooling subsystem, from which the user can select. Once the user selects the correct component(s) from the list 200, the component(s) is preferably added to a repair component list 225, which will be used to prepare the repair estimate.

In a manner similar to the above-described methods, the category-based repair information gathering page 215 preferably also allows the user to enter the required quantity of each component to be repaired or replaced, although the quantity can also be supplied at a later time. In this particular embodiment of the present invention, the proper quantity of each component can be submitted by selecting the appropriate component name from the categorized list 220 and using the "add" arrow 230 to transfer the proper number of the component to the repair component list 225. Obviously, the quantity associated with each component could also be entered in a variety of other ways, all of which are considered within the scope of the present invention.

When a component(s) is selected from the categorized list, the system accesses a database of components from which the component(s) to be repaired or replaced can be identified and information related thereto may be obtained. The component database may be owned by the owner of the system of the present invention. Alternatively, the component database may be owned by a separate entity and accessed by the system of the present invention.

It is recognized that a user may need to provide component information by more than one method, such as through a combination of the methods presented in FIGS. 7-9. Consequently, by selecting the "continue" arrow 235a, 235b, 235c or some other provided means on any of the part number-based repair information gathering page 175, part name-based repair information gathering page 190, or category-based repair information gathering page 215, respectively, the user is preferably returned to the repair information directing page 150. The user may then select from any of the available methods 155, 160, 165 presented thereon in order to provide the system 5 with the remaining component information. Obviously, providing the user with the ability to enter component information via one method and subsequently enter additional component information via an alternate method could be accomplished in other ways, all of which are considered to be within the scope of the present invention. Preferably, a means such as the "finished" arrow 240 or some other action button or link, is provided on the repair information directing page 150 to allow the user to indicate that all repair component data has been provided.

It is also contemplated and understood that information relating to components to be repaired or replaced may be entered using a method or methods not described above. It should be realized that there are many other acceptable methods of entering such information into the system of the present invention that would be familiar to one skilled in the art and may be employed herein. By whatever method used, each component of the vehicle that must be repaired or replaced is entered into the system.

In association with obtaining information regarding a component to be replaced, the system may optionally identify the entered component in various ways. For example, once the user has entered, selected, or otherwise confirmed a component to be replaced, the system may display a description of the component. The component description may include various information, such as, for example, the location of the component, the function of the component, and other components that interact with and/or may also have to be repaired or replaced. In conjunction with the component description, or alternatively thereto, the system may display an image of the component, such as a photograph or a drawing thereof. The image may be the actual component, or be representative of the component. Any such description or image of a component may be presented on the same web page where the component information is entered. In such a case, the information and/or image may be presented in a separate and controllable window, as an overlay, or by any of various other known techniques. Prior to proceeding to the next step of the repair estimate preparation process, the system may also display a list of all components to be repaired or replaced that have been entered by the user.

Figure 10:
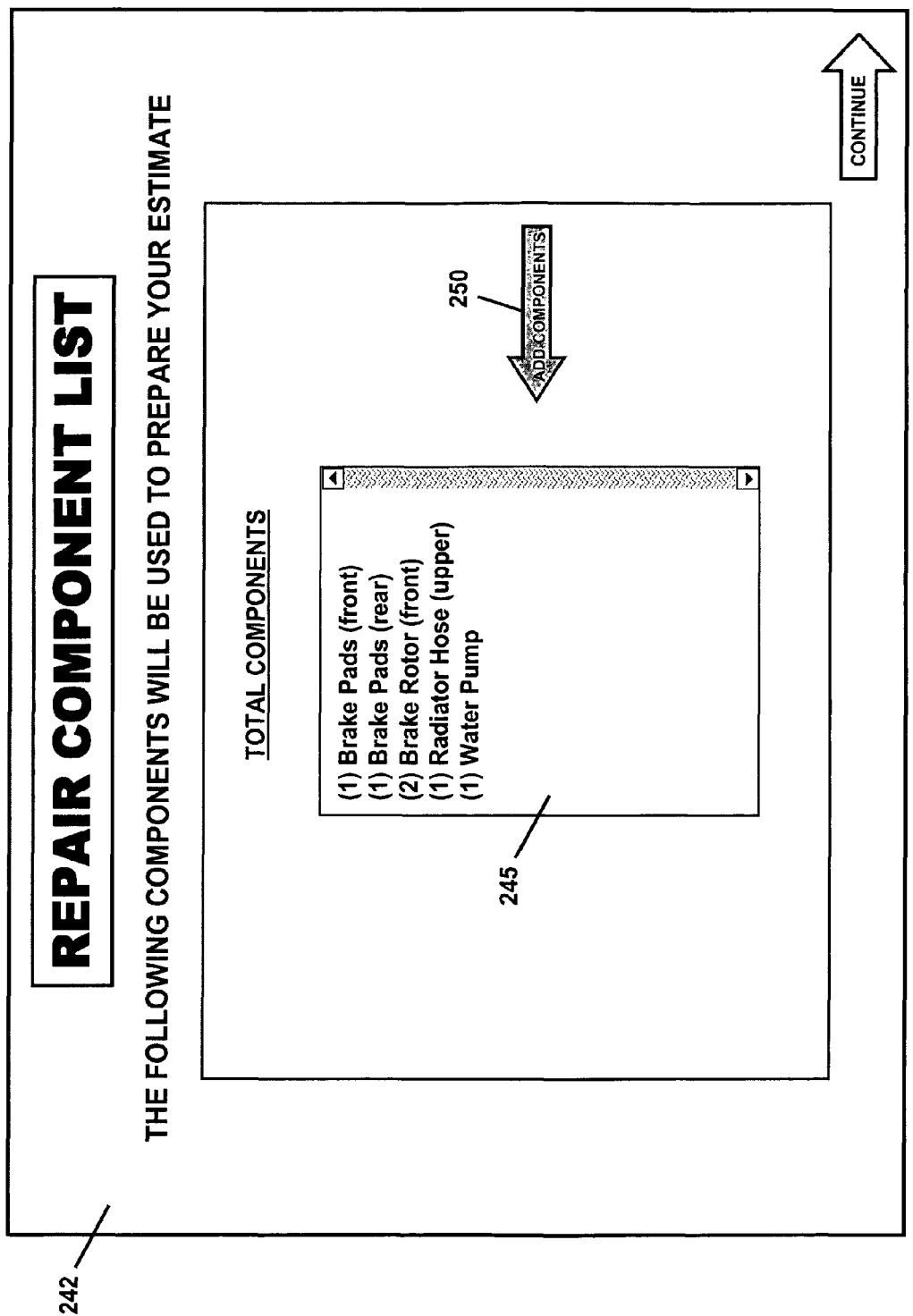
FIG. 10 illustrates an exemplary repair component listing page of a website associated with an Internet-based system and method of the present invention.

An exemplary summary component list is depicted on the repair component list page 242 of FIG. 10. The summary component list 245 shown in this particular example provides a brief description of each component to be repaired or replaced, along with the quantity associated with each component. Certainly, a plethora of other formats are also possible. Preferably, a means such as the "add components" arrow 250 or some other action button or link is provided to allow a user to add overlooked or otherwise neglected components to the list (and to the estimate). For example, in this particular embodiment of the present invention, the arrow 250 may return the user to the repair information directing page 150, where the user can select the desired method for entering the additional component information into the system.

Subsequent to, or in conjunction with, receiving the identity of a component to be replaced, the system of the present invention retrieves data relating thereto that will be necessary for preparing the estimate. This data may include the cost of the component to be replaced, as well as the cost of any ancillary items (e.g., fasteners, gaskets, etc.) required thereby and not included with the component. The component cost(s) may be based on the OEM's recommended cost, or on virtually any other base cost deemed appropriate for use in calculating the estimate. Other data that may be retrieved will typically include a standard labor time for replacing the component, which is also typically established by the manufacturer of the vehicle. The retrieved data will also typically include a labor rate for replacing the component(s). The labor rate may a national average labor rate, or a labor rate that is more accurately representative of repair facilities in the user's area (as will be described in more detail below). Both the component costs and labor times and/or rates may also be based on paid insurance claim data, as opposed to suggested component costs and labor times set forth by the vehicle manufacturer or some other source. Each of the component cost, labor time, and labor rate, may come from a single database, or from multiple databases. These database may be owned by the owner of the system of the present invention. Alternatively, the databases may be owned by a separate entity and accessed by the system of the present invention.

At some point during the gathering of information, the system may ask the user whether the user is interested in effecting the repair utilizing other than OEM components—which will generally be the default component type used by the system and method of the present invention. If the user answers in the negative, the repair estimate will be unaffected. If the user answers in the affirmative, however, the generated repair estimate may also show a repair cost using an aftermarket (i.e., new but non-OEM) component, a remanufactured component, and/or a used component. The estimate reflecting the use of the non-OEM component(s) may appear on the same page as an estimate using only OEM components, or may appear on a separate page(s).

As one exemplary option 260 of the present invention, the system may ask the user whether the user is interested in effecting the repair using an aftermarket component—such as via the component options page 255 shown in FIG. 11. If the user answers in the negative, the repair estimate will be unaffected. If the user answers in the affirmative, however, the generated repair estimate may show a repair cost using an aftermarket, as well as or as opposed to, an OEM component. The estimate reflecting the use of the aftermarket component may appear on the same page as an estimate using an OEM component (see FIG. 15), or may appear on its own page. The estimate may also illustrate the cost savings realized if an aftermarket component is selected. When only certain components of a repair involving multiple components to be replaced are available in aftermarket form, the system may incorporate the cost of those aftermarket components into the estimate. Depending on the design of the system and the selections made by the user, the remainder of the components to be replaced can then be entered into the estimate using the cost of OEM components, remanufactured components, or used components. In such a case, the system may indicate those components that can, or cannot, be purchased in aftermarket form.

When an estimate using an aftermarket component is prepared, the system retrieves data relating to the component from an appropriate source. For example, the source may be a database(s) of aftermarket components that are available from one or more manufacturers, wholesalers, or retailers. The database(s) may be resident on the central data server, or on a data server(s) associated with a manufacturer or seller of aftermarket components. The system 5 may also connect to another website in order to access information regarding an aftermarket component, retrieve information through the website, and provide it to the appropriate software application(s) of the system. For example, the system 5 may obtain the requisite information directly from the website of an aftermarket component manufacturer or seller.

With respect to the use of aftermarket components, it is contemplated that the information relating thereto may be retrieved from a database(s) owned or controlled by one or more vehicle component wholesalers or retailers. For example, the system 5 may communicate with a database owned by NAPA Auto Parts®, AutoZone®, or virtually any other large or small wholesale or retail establishment. The system 5 may then select for use in the estimate the lowest cost found for the particular aftermarket component in question, may select the cost of the most conveniently available component, or may use some other criteria to determine which cost to select for use in the estimate. The system may further indicate the source of the aftermarket component(s) used in preparing the estimate. It may also be possible to allow the user to electronically purchase the aftermarket component(s), should the user so wish after being presented with the estimate(s).

As another exemplary option 265 of the present invention, the system may ask the user whether the user is interested in effecting the repair using a remanufactured component—such as via the component options page 255 shown in FIG. 11. If the user answers in the negative, the repair estimate will be unaffected. If the user answers in the affirmative, however, the generated repair estimate may show a repair cost using a remanufactured, as well as or as opposed to, an OEM component. The estimate reflecting the use of the remanufactured component may appear on the same page as an estimate using an OEM component (see FIG. 15), or may appear on its own page. When an estimate using a remanufactured component is prepared, the system retrieves data relating to the component from an appropriate source. For example, the source may be a database(s) of remanufactured components that are available from one or more manufacturers, wholesalers, or retailers of such components. The database(s) may be the same or different than the database(s) accessed to obtain information on an aftermarket component(s). The database may be resident on the central data server, or on a data server associated with a seller or manufacturer of a remanufactured component. The system 5 may also connect to another website in order to access information regarding a remanufactured component, retrieve information through the website, and provide it to the appropriate software application(s) of the system 5. The system 5 may select for use in the estimate the lowest cost found for the particular remanufactured component in question, may select the cost of the most conveniently available component, or may use some other criteria to determine which cost to select for use in the estimate. The system may further indicate the source of the remanufactured component(s) used in preparing the estimate. It may also be possible to allow the user to electronically purchase the remanufactured component(s), should the user so wish after being presented with the estimate(s).

As yet another exemplary option 270 of the present invention, the system may ask the user whether the user is interested in effecting the repair utilizing a used component—such as via the component options page 255 shown in FIG. 11. If the user answers in the negative, the repair estimate will be unaffected. If the user answers in the affirmative, however, the generated repair estimate may show a repair cost utilizing a used, as well as or as opposed to, an OEM component. In this case, the system may have access to one or more databases of used components. For example, the system may communicate with database(s) containing the inventory of one or more auto salvage yards. In this embodiment, the system may be able to check inventory for availability of a particular component, retrieve cost information, and even reserve a component for purchase. The system may communicate with the auto salvage yard database(s) directly. Alternatively, the system may simply link to an existing website associated with an auto salvage yard, through which inventory and price may be checked, and/or components can be purchased.

It is possible for the system of the present invention to generate a repair estimate using some combination of OEM, aftermarket, remanufactured, and/or used components. For example, if a user answers in the affirmative to the use of certain, or all, of the options presented on the component options page 255 of FIG. 11, the system may create an estimate using the cost of any combination of the selected component types. The resulting estimate may be governed by any of various criteria—such as absolute lowest cost. In such a case, if a component is unavailable in its lowest cost form, the next least expensive form of component may be substituted (e.g., a remanufactured component may be substituted for a used component). Alternatively, the OEM cost may be substituted by default for the cost of any unavailable component of a different type. Obviously, many other criteria could be established for determining what type of components are selected for a given repair, and such are considered to be within the scope of the present invention.

In addition to providing the information necessary to preparing the repair estimate, it is preferred, but not essential, that the user indicate the geographic location where the repair will take place. By doing so, the system can retrieve component cost and labor rate data that most accurately reflects those of the user's area. Additionally, the geographic information can further be used to provide the user with a list of repair facilities and/or other entities in the area (as described in detail below).

The user may be provided with the option of submitting the geographic information, or the geographic information may be requested from the user, at virtually any point in the repair estimate preparation process. For example, the geographic information may be requested prior to or in conjunction with the vehicle information. Alternatively, the geographic information may be derived from yet-to-be-entered payment information. In this particular embodiment of the present invention, a repair location information page 275 (see FIG. 12) is presented to the user just prior to a request for payment information. This exemplary repair location information page 275 allows the user to enter the zip code 280 where the repair is to take place, which information can be used to retrieve the proper labor rate information and to most accurately prepare the subsequent estimate. Other methods of requesting or allowing the user to provide geographic information would be obvious to one skilled in the art, and need not be discussed in detail herein.

Once the requisite repair information and, optionally, geographic information has been received, and prior to presenting the user with the repair estimate(s), the system and method of this embodiment of the present invention requires that payment information be provided. As can be seen by reference to FIG. 13, payment information can be provided on a payment information gathering page 285, and the information can thereafter be submitted and approved electronically. In the particular payment information gathering page 285 shown, personal information 290 as well as specific payment information 295 can be provided. However, any number of known formats and methods for obtaining the required payment information, and submitting and verifying approval thereof can be used with the present invention.

It is contemplated that there could be different costs associated with preparing different types, or levels, of repair estimates. For example, if the user wants only an estimate using OEM components, the user may be charged a basic price. An increase in price may accompany each additional type of estimate requested by the user. Thus, the price for an estimate using all of OEM, aftermarket, remanufactured, and used components, may be higher than the price of the basic estimate. Further, the system may levy charges for other options selected by the user. Alternatively, the system may charge one price for an estimate, no matter how many options have been selected by the user.

Figure 13:
FIG. 13 illustrates an exemplary payment information gathering page of a website associated with an Internet-based system and method of the present invention.

The present invention may also make provision for users whom do not wish to submit personal and/or financial information electronically. As shown in FIG. 13, for example, this particular embodiment of the present invention allows the user to telephone a service representative or an automated telephone answering system, and provide the necessary personal and financial information over the phone. Once the payment information has been telephonically accepted and verified, the on line estimation process may be remotely authorized and allowed to continue. Alternatively, the user may be provided with a password or some other approval code that can be entered into the user interface 10 and that allows the estimate preparation process to proceed. The user may receive the approval code via telephone or e-mail, for example. In this particular embodiment, the approval code is entered into the payment section 295 of the payment information gathering page 285, although the approval code could also be entered into some other page of the website.

It should be understood that, despite the order presented in this particular example of the present invention, payment information may be requested from the user or the user may be provided with the option of submitting payment information at virtually any point in the repair estimate preparation process. For example, payment information may be requested prior to accepting any other type of information from the user. In such a case, the personal information related thereto may be used to identify the user with respect to preparation of the repair estimate and/or to personalize the estimate preparation process. Regardless of when the payment information is requested or provided, the information may be saved for use in preparing future estimates, or for other reasons.

Once the user's payment information has been received and approved, the repair estimate(s) is presented to the user. The repair estimate(s) may be displayed in a variety of ways, and the estimate(s) may make use of various formats. The display of the repair estimate(s) may be governed by aesthetics as well as the estimate options previously selected by the user.

An exemplary repair estimate 300 based on the previously entered vehicle, component, and geographic location data is presented in FIG. 14. This exemplary estimate 300 was prepared using only OEM component costs. The component costs and labor times were retrieved from appropriate databases. The average labor rate reflects the average labor rates for the geographic location provided via zip code 280 on the repair location information page 275 of FIG. 12. As can be seen, in addition to the specific components provided by the user, the system 5 has also retrieved data on components associated therewith. More specifically, the system 5 has automatically factored the cost of new hose clamps and engine coolant into the cost of the total repair.

The particular format used in the estimate 300 of FIG. 14 indicates a quantity 305 and description 310 for each component to be repaired or replaced, and a cost 315 associated with the total quantity of each type of component. It is also indicated that the estimate reflects the cost of OEM components only. A separate field is provided to indicate the labor time 325 associated with each specific repair that must take place. A total component cost 320, as well as total labor time 325 are presented. The average labor rate 330 for the provided zip code is also presented. Finally, the total estimated cost of a fair repair 335 based on the provided and retrieved information is presented. The total estimated cost of a fair repair 335 is a summation of the total component cost 320 and a total labor cost, which is simply the total labor time 325 multiplied by the average labor rate 330.

Another exemplary repair estimate 340 can be viewed in FIG. 15. The format used for this estimate 340 again indicates a quantity 345 and description 350 for each component to be repaired or replaced. A separate field is again provided to indicate the labor time 355 associated with each specific repair that must take place. However, this repair estimate 340 also reflects the user's affirmative answers to the queries regarding the use of aftermarket, remanufactured, and used components presented in FIG. 11. More specifically, the estimate 340 presents the user with repair costs reflecting the use of OEM components 360, aftermarket components 365, remanufactured components 370, and used components 375.

A total component cost 380, 385, 390, 395 is shown for each type of component used. A total labor time 400 is presented again, as well. As with the estimate 300 of FIG. 14, the average labor rate 410 for the provided zip code and the total estimated cost of a fair repair based on the provided information is also presented in the estimate 340 of FIG. 15. The total estimated cost of a fair repair is again the summation of the total component cost 380, 385, 390, 395 and a total labor cost, which is simply the total labor time 400 multiplied by the average labor rate 410. However, because there are four different total component costs associated with this estimate 340, four total estimated fair repair costs 420, 425, 430, 435 are also presented. The four total estimated fair repair costs 420, 425, 430, 435 correspond to repairs using OEM, aftermarket, remanufactured, and used components, respectively.

As can be observed from a review of the estimate 340 of FIG. 15, several of the components to be repaired or replaced are unavailable in remanufactured and used form. When such a combination estimate 340 is requested and certain components are unavailable in the requested form, the system will substitute the cost of another component type for the cost of the unavailable components. In the exemplary estimate 340 shown, the cost of OEM components has been substituted by default for the cost of the unavailable remanufactured and used components. Of course, the system may be set to substitute the cost of another type of component in this situation or, alternatively, the user may be asked how the substitution should be made. As shown in FIG. 15, it is also preferable, but not necessary, that the user be notified 440 when such a substitution has occurred.

With respect to generation of an estimate using some combination of OEM, aftermarket, remanufactured, and/or used components, it is preferable that the user has provided the system 5 with the geographic location of the repair. With possession of such information, the system 5 is better able to provide an accurate estimate. For example, the system 5 can use the geographic information to narrow the sources for which it looks for the various types of components. The search criteria used by the system 5 in such a case may be dependent on the user's answer to one or more other queries (not shown): such as whether the user is willing to pay shipping costs to receive a component from a remote source. When a local source(s) is identified, the user may be given the option to reserve or purchase the component(s), and may also be provided with contact and/or location information (such as a map) to facilitate retrieval of the component. Obviously, it is also possible that a repair facility performing the repair(s) and provided with the necessary information may purchase and/or retrieve the component(s) on behalf of the user.

The geographic location information may also be used to effectuate other optional aspects of the present invention. For example, once the user has been presented with the repair estimate 300, 340, the system 5 may ask or otherwise prompt the user regarding viewing of a list of repair facilities in their area. In this particular embodiment of the present invention, the user is directed from the estimate 300, 340 to a repair facility query page 445 similar to that shown in FIG. 16. The user is then presented with the option 450 of electing to see a list of repair facilities near the geographic location previously provided. Alternatively, a list of repair facilities may be automatically displayed after the estimate has been presented.

Figure 16:
FIG. 16 illustrates an exemplary repair facility query page of a website associated with an Internet-based system and method of the present invention.

In this embodiment of the present invention, a negative response from the user, or an ignoring of the prompt, results in no display of a repair facility list. However, if the user answers in the affirmative (as shown in FIG. 16), a repair facility list is presented. A repair facility list may be presented in various ways. For example, as shown on the participating repair facilities page 455 of FIG. 17, a list of participating repair facilities 460 may be presented to the user in response to the user's request. This particular list 460 shows only those repair facilities that have agreed to honor repair estimates generated by the system and method of the present invention. Only the repair facility name 465 and brief location information 470 is shown to be presented by the list 460. Other information may also be presented, however, whether within the list 460, or elsewhere on the page 455.

Figure 18:
FIG. 18 illustrates an alternate embodiment of a repair facility display page of a website associated with an Internet-based system and method of the present invention.

In an alternate embodiment, an affirmative response to the query of FIG. 16 may direct the user to a local repair facilities page 475, as illustrated in FIG. 18. In this embodiment, a more comprehensive list of repair facilities 480 may be presented to the user. For example, the list 480 may include all repair facilities near the geographic location of the repair that are capable of performing the needed work. Again, only the repair facility name 485 and brief location information 490 is shown to be presented by the list 480, although other information may also be presented—whether within the list 480, or elsewhere on the page 475. When presenting this type of list 480 to the user, the system may indicate those repair facilities that have agreed to honor repair estimates generated by the system and method of the present invention. In this particular example, such indication is achieved through the use of an asterisk. Many other techniques may also be employed for this purpose.

Any such list of repair facilities may be further identified or categorized. For example, it may be indicated whether a particular repair facility will make repairs using aftermarket, remanufactured, and/or used components. The repair facilities may also be categorized, such as, for example, by type (e.g., dealer, national chain, local garage, etc.), or by whether they are factory authorized.

Whatever type of repair facility list is presented, it is preferred, but not essential, that the user be able to select the repair facility and thereby obtain additional information relating thereto. For example, selecting a particular repair facility ("M's Auto Service" in the examples of FIGS. 17 and 18) in this embodiment of the present invention, directs the user to the selected repair facility information page 500 of FIG. 19. On this page 500, the user is provided with more detailed information regarding the selected repair facility. This particular example shows detailed contact information 505 for the repair facility, as well as its hours of operation 510. A means 520 is also provided by which the user may access a map showing the location of the selected repair facility. The map may be accessed directly from a database, or the user may be linked to a mapping website for this purpose. It is also preferred, but not necessary, that a means such as the "list" arrow 520 or some other action button or link, be provided to direct the user back to the repair facility list should the currently selected repair facility prove unacceptable after a review of the information relating thereto. Certainly, various other information can also be presented on such a repair facility information page 500.

Figure 19:
FIG. 19 illustrates an exemplary selected repair facility information page of a website associated with an Internet-based system and method of the present invention.
Figure 20:
FIG. 20 illustrates an exemplary repair appointment scheduling page of a website associated with an Internet-based system and method of the present invention.
Figure 21:
FIG. 21 illustrates a repair component information/procurement directing page of a website associated with an Internet-based system and method of the present invention.

As another option of the present invention, the user may be presented with an opportunity to electronically schedule a repair appointment with the selected repair facility. As shown in FIG. 19, a "schedule" button 525 or some other means may be provided on the selected repair facility information page 500 (or on some other web page) to direct the user to an electronic scheduling page. An example of such an electronic scheduling page 530 is depicted in FIG. 20.

The scheduling page 530 allows the user to schedule a repair appointment with the selected repair facility. Electronic scheduling may be accomplished through a web page associated with the system of the present invention and in communication with an electronic scheduling service of the selected repair facility. In this case, available dates/times 535 may be presented to and selected by the user, and the data associated therewith may be transferred to the electronic scheduling service of the selected repair facility. Preferably, data regarding the repair to be performed is also transferred to the repair facility by the present invention. The electronic scheduling service of the selected repair facility may be available to the general public or, alternatively, may be a special service that is only available to users of the present invention.

Electronic scheduling may also be accomplished by simply connecting the user to a web page of the selected repair facility, where the user is able to make an appointment. Once the appointment is made, the user may be transferred back to the website associated with the present invention. Alternatively, the scheduling web page of the selected repair facility may be opened as a separate window, which can be worked in and closed without affecting the present invention. In any event, it is preferred that the user receive a confirmation of the scheduled appointment.

If a user has elected to obtain a repair estimate using aftermarket, remanufactured, and/or used components, the system and method of the present invention may provide the user with additional information thereon, or with the opportunity to purchase the components electronically. For example, as illustrated by the repair component information/procurement page 540 of FIG. 21, prior to exiting the website, the user may be presented with the opportunity to view such additional information or to purchase specific components. If the user wishes to see more information on these components and/or wishes to procure one or more thereof, the user is directed to one or more additional web pages.

Figure 22:
FIG. 22 illustrates an exemplary aftermarket component information and/or procurement page of a website associated with an Internet-based system and method of the present invention.

As one example, a user who has elected to have a repair estimate prepared using aftermarket components may be directed to an aftermarket component information page 545 such as that shown in FIG. 22. In this embodiment of the present invention, the aftermarket component information page 545 has retrieved data from the source of the aftermarket component(s) and presented the information to the user. In this particular example, the component information, including the cost, has been retrieved from Napa Auto Parts®. Other sources of aftermarket component information may also be used, and information (including component price) may be displayed for more than one source on a single page. The source(s) 550 of the aftermarket component(s) is preferably identified, and information may be given regarding source locations 555 that are near to the geographic location of the repair.

If possible, the user may be given the opportunity to purchase one or more of the aftermarket components electronically 560. When the user selects this option, the user interface 10 of the present invention may act to present to the user cost, shipping, and any other information necessary to the purchase. The user interface 10 may also act to collect from the user payment information and/or any other information relevant to the purchase. In this embodiment, the system may retrieve and transmit data to/from another website (e.g., the NAPA website) and/or data server as necessary to process the purchase. For example, the system may collect data from the user, transmit the data to a source website, receive a confirmation of the order, and present the user with the confirmation and other information relevant to the purchase. In an alternative embodiment of the present invention, the user interface 10 may simply provide a link by which the user can access a source website and purchase the components therefrom.

Figure 23:
FIG. 23 illustrates an exemplary remanufactured component information and/or procurement page of a website associated with an Internet-based system and method of the present invention.

As another example, a user who has elected to have a repair estimate prepared using remanufactured components may be directed to a remanufactured component information page 565 such as the page depicted in FIG. 23. In this embodiment of the present invention, the remanufactured component information page 565 has retrieved data from the source of the aftermarket component(s) and presented the information to the user. In this particular example, the component information, including the cost, has again been retrieved from Napa Auto Parts®. Other sources of remanufactured component information may also be used, and information (including component price) may again be displayed for more than one source on a single page. The source(s) 570 of the aftermarket component(s) is preferably identified, and information may be given regarding source locations 575 that are near to the geographic location of the repair.

As in the case of aftermarket components, the user may be given the opportunity to purchase one or more of the remanufactured components electronically 580. The system may again act as an intermediary between the source and the user by collecting and/or transmitting data therebetween. Alternatively, the user interface 10 may simply provide a link by which the user can access a source website and purchase the components therefrom.

Figure 24:
FIG. 24 illustrates an exemplary used component information and/or procurement page of a website associated with an Internet-based system and method of the present invention.
Figure 25:
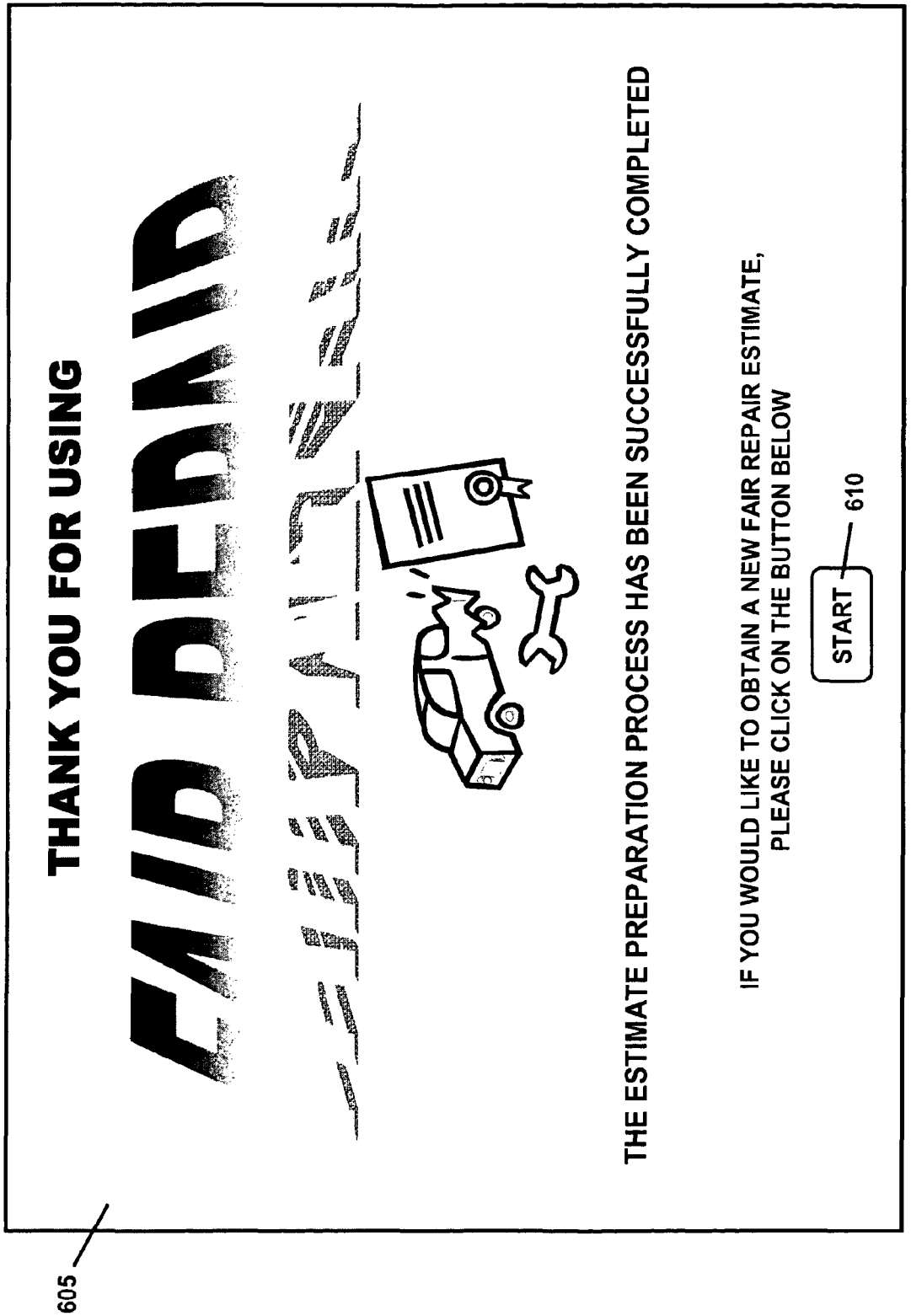
FIG. 25 illustrates an exemplary ending page of a website associated with an Internet-based system and method of the present invention.

As yet another example, a user who has elected to have a repair estimate prepared utilizing used components may be directed to a used component information page 585 such as the page illustrated in FIG. 24. In this embodiment of the present invention, the used component information page 585 has retrieved data from the source of the used component(s) and presented the information to the user. In this particular example, the component information, including the cost, has been retrieved from a supplier named Al's Auto Salvage. Other sources of used component information may also be used, and information (including component price) may again be displayed for more than one source on a single page. The source(s) 590 of the aftermarket component(s) is preferably identified, and information may be given regarding source locations 595 that are near to the geographic location of the repair.

As in the case of aftermarket and remanufactured components, the user may be given the opportunity to purchase one or more of the used components electronically 600. The system may again act as an intermediary between the source and the user by collecting and/or transmitting data therebetween. Alternatively, the user interface 10 may simply provide a link by which the user can access a source website and purchase the components therefrom.

Once the repair estimate has been prepared and the user has reviewed any optional and/or desired information relating thereto, the user may be directed to an ending page 605. The ending page may indicate that the estimate preparation process is complete 610, and may afford the user the opportunity to initiate preparation of a new repair estimate 615. Other information and options may, of course, also be conveyed to the user via the ending page 605.

It is to be understood that the above-described Internet-based system and method of obtaining a repair estimate has been presented for purposes of illustration only, and is not to be construed as limiting the scope of the present invention in any way. One skilled in the art would understand that there are virtually infinite ways to request, receive, and present information relating to the repair estimate, and to construct a system for preparing such an estimate. Consequently, there are many other possible embodiments of the present invention, and many other features that could be provided but have not been shown or discussed in detail above. For example, it is contemplated that a user could be presented with a code that will allow the user to return to the system website and review the completed repair estimate for a given period of time. It is similarly contemplated that a user may be allowed to stop the repair estimate preparation process midstream, save the provided information, and return to the website at a later time to complete the preparation process and receive the estimate. A code may again be provided to facilitate such a process. Thus, as can be understood, a multitude of modifications can be made to the exemplary Internet-based system and method of obtaining a repair estimate shown and described herein, while remaining within the scope of the present invention.

Figure 26:
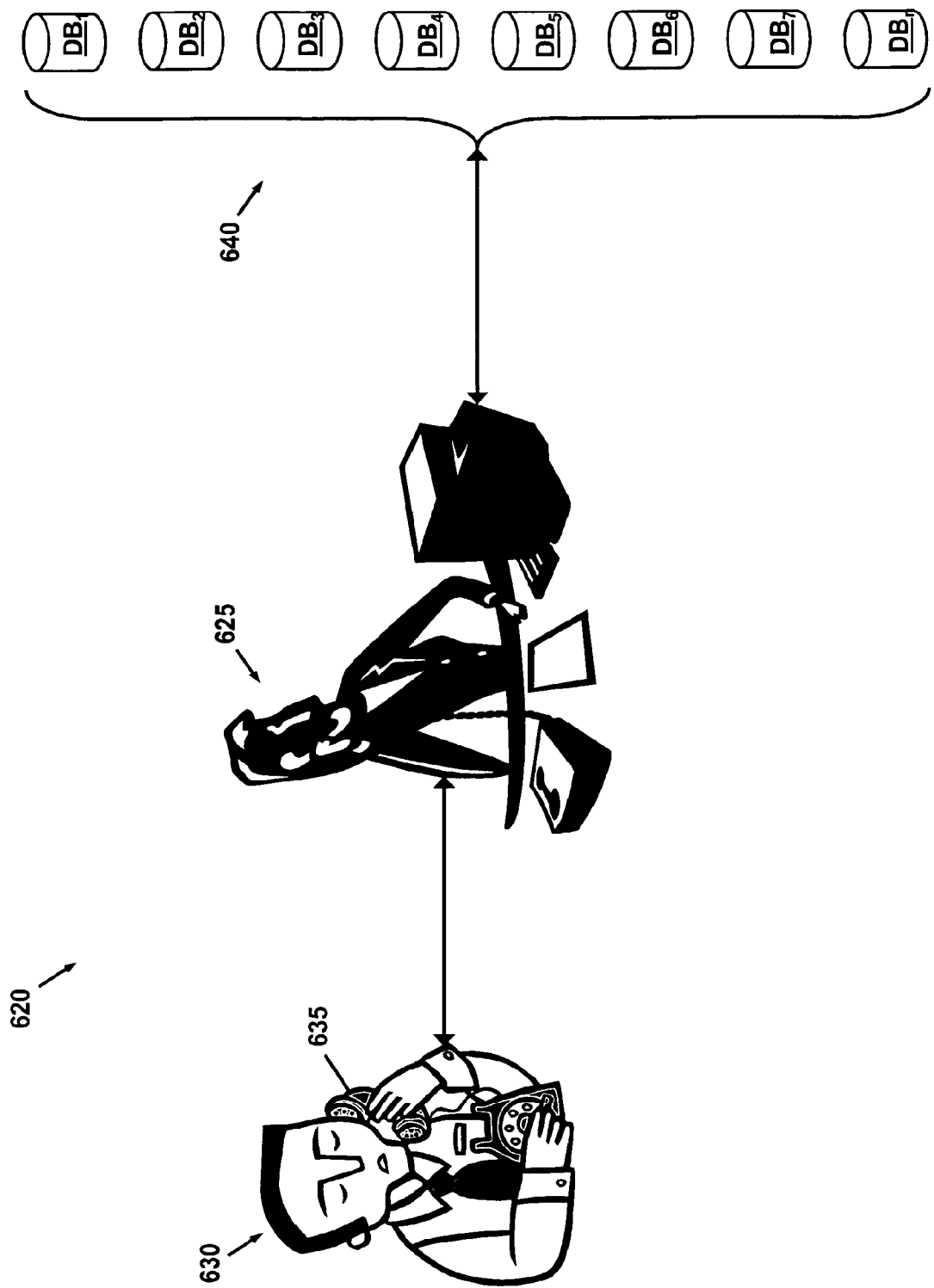
FIG. 26 is a block diagram representing an alternate embodiment of a system of the present invention, wherein a repair estimate is obtained by providing information to a service representative.

An alternate embodiment of a repair estimate preparation system 620 can be observed in the diagram of FIG. 26. In this embodiment, the system employs a service representative 625 to accept information from a user 630 over a telephone or a similar communication device 635. The service representative 625 has access to one or more databases 640 by any of various conventional means. For example, the service representative 625 may have access to the databases $DB_1$-$DB_n$ used by the Internet-based system 5 discussed previously. Alternatively, the service representative 625 may have access to one or more reference manuals. In any event, the service representative 625 is able to locate and retrieve all of the information necessary to prepare the repair estimate.

Figure 27:
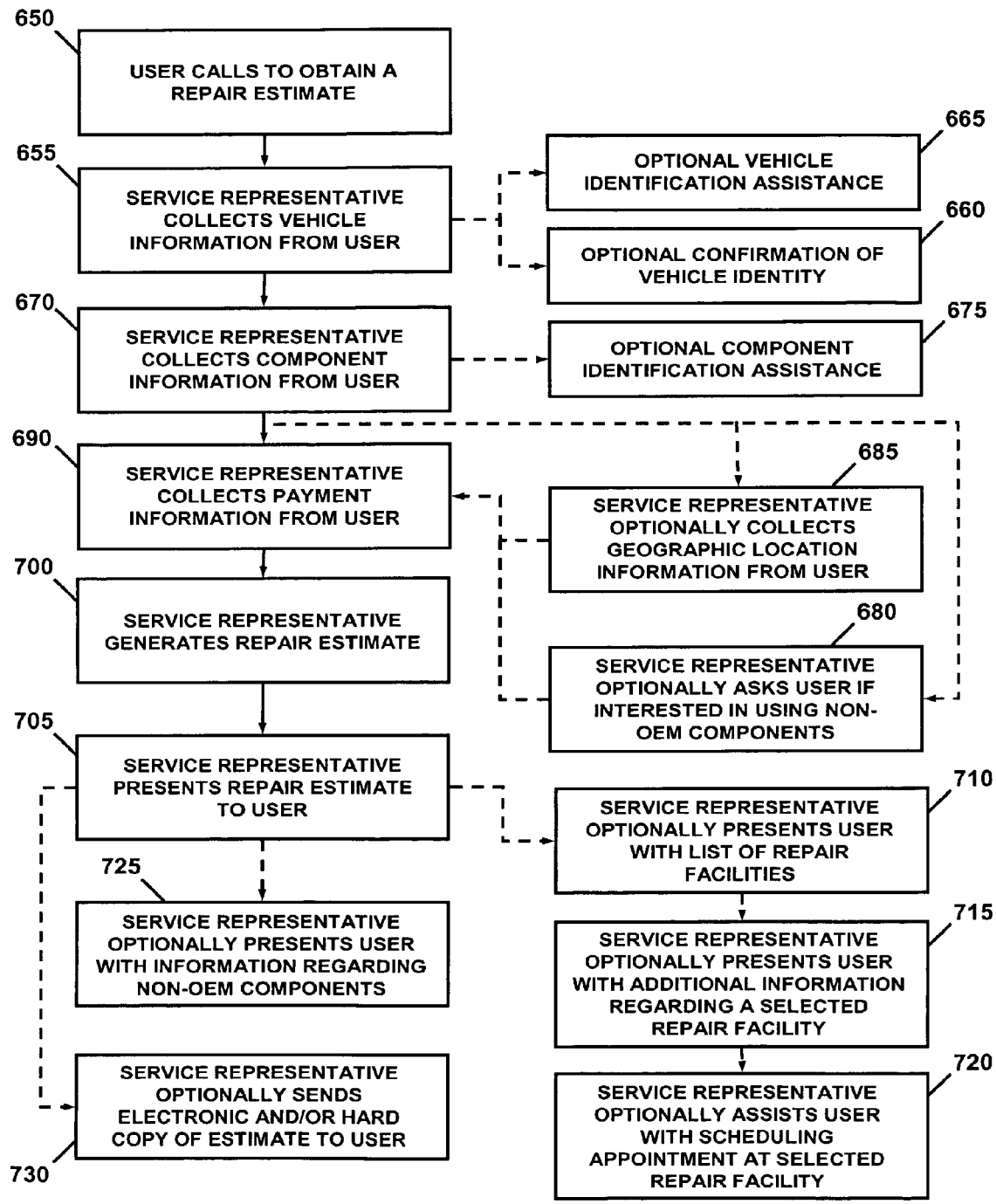
FIG. 27 is a flow diagram illustrating the steps of a method of obtaining a repair estimate using the system of FIG. 26.

As illustrated in the diagram of FIG. 27, the steps of generating a repair estimate according to a service representative-based embodiment of the present invention may largely mirror the steps of generating a repair estimate using an Internet-based embodiment of the present invention. Of course, like with the Internet-based embodiment, the various steps associated with the method of the service representative-based embodiment can vary considerably from the example shown.

In the method described by FIG. 27, a user initially calls a provided telephone number to obtain a repair estimate 650. The user is subsequently connected with a service representative. In a similar manner to the Internet-based system and method discussed above, the service representative proceeds to collect vehicle information 655 from the user. The user may provide the vehicle information in various forms, such as by year/make/model or VIN, as described above. The service representative may optionally confirm the identification of the vehicle 660 and/or may optionally assist the user in identifying the vehicle 665.

The service representative also collects component information 670 from the user. The component information may be provided by part name, part number, or various other means. The service representative may optionally assist the user in identifying components needing repair or replacement 675. Once the requisite component information has been collected, the service representative may optionally query the user as to whether the user would like an estimate using aftermarket, remanufactured, and/or used components, as well as, or as opposed to, OEM components 680.

Preferably, but optionally, the service representative also collects from the user information regarding the geographic location of the repair 685. By collecting such information, the service representative will be better able to provide an accurate repair estimate to the user.

Once all of the necessary information has been collected, and the service representative has queried the user as to the possible estimate options, the service representative preferably proceeds to collect the user's payment information 690. Payment for the estimate may be accepted in multiple forms, such as by credit card, debit card, electronic check, or any of various other forms known to those skilled in the art.

Upon approval of the user's payment information, the service representative initiates preparation of the repair estimate 700. The service representative may generate the repair estimate by entering the information received from the user into an appropriately designed software application running on a computer accessible to the service representative. Alternatively, the service representative may enter the information into an Internet-based software application, or may utilize the Internet-based system 5 described above.

Upon completion of the repair estimate, the service representative orally presents the user with the total fair estimate for the repair(s) to be performed 705. Preferably, but not necessarily, the service representative also informs the user of other details relating to the estimate, such as, for example, the individual component costs, the total component cost, the total labor time, and the average labor rate. For a combination estimate, the service representative also preferably differentiates between the repair costs associated with using different types of components.

Once the repair estimate has been fully explained to the user, the service representative may offer to provide the user with a list of repair facilities nearby to the intended location of the repair 710. The list of repair facilities may be offered and/or provided in any form. For example, a list of all local repair facilities, or a list of only repair facilities in the area that will honor the fair repair estimate may be offered. The service representative may otherwise identify repair facilities in the area that will honor the fair repair estimate in a manner similar to that of an Internet-based system of the present invention.

If a user identifies of interest a particular repair facility, or facilities, from a list presented them by the service representative, the service representative may provide additional information regarding each repair facility to the user 715. Further, if the user is interested in scheduling a repair appointment with a particular repair facility, the service representative may be able to schedule the appointment for the user or otherwise assist the user in doing so 720.

The service representative may also present detailed information regarding aftermarket, remanufactured, and/or used components utilized in the repair estimate to the user 725. For example, if the user is interested in effecting the vehicle repair using one or more of such components, the service representative may provide source, brand and/or other related information to the user. The service representative may further assist the user in reserving and/or purchasing such components.

As can be understood, the service representative-based system and method of obtaining a repair estimate, may provide for options and results similar to those of an Internet-based system and method. Most all of the information received and presented by the Internet-based system and method can be received and presented via the service representative-based system and method.

Figure 28:
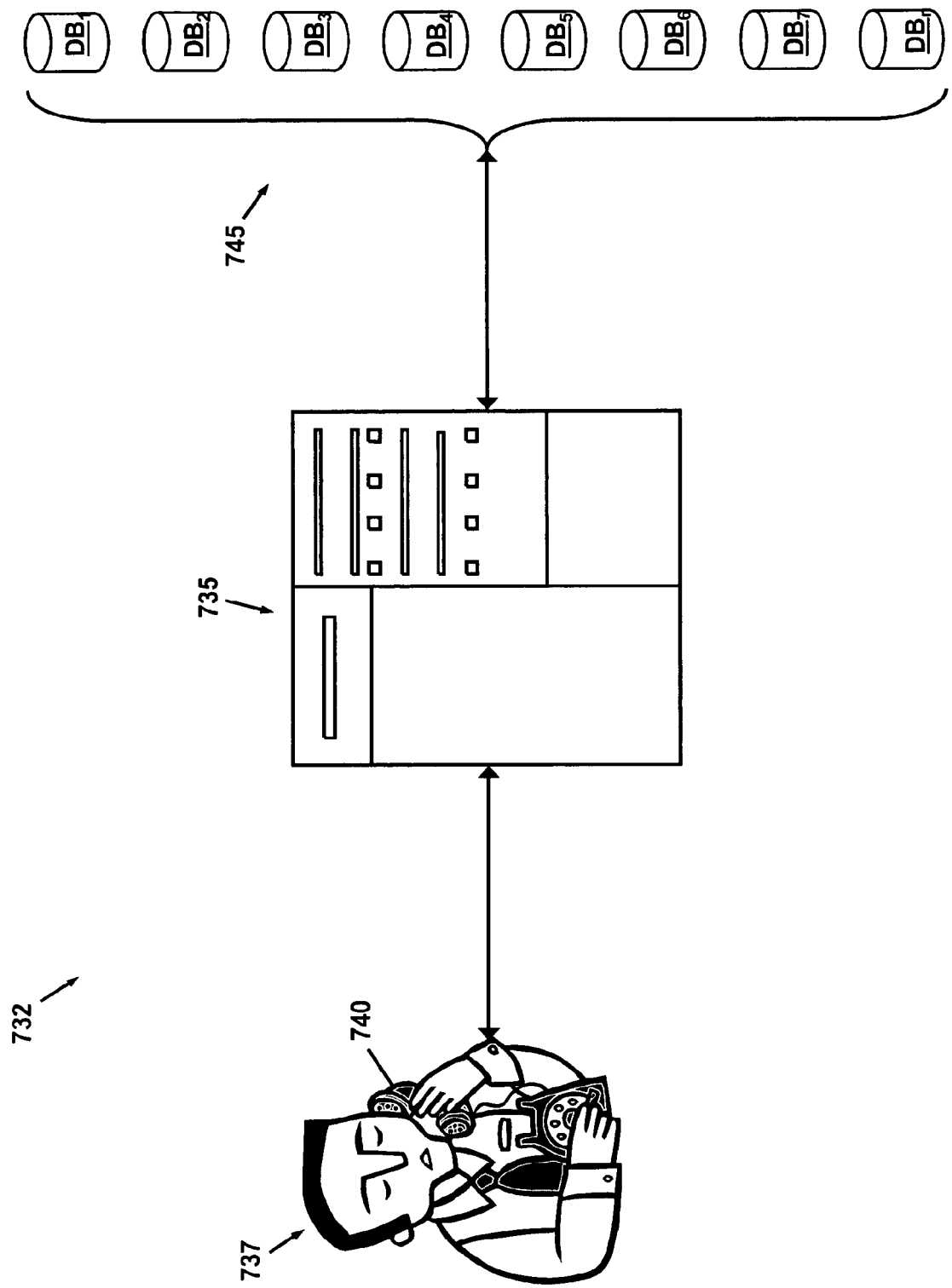
FIG. 28 is a schematic representation of another embodiment of a system of the present invention, wherein a repair estimate is obtained by providing information to an automated telephone system.

Another embodiment of a repair estimate preparation system 732 can be observed in the diagram of FIG. 28. In this embodiment, the system employs a automated phone system 735 to accept information from a user 737 over a telephone or a similar communication device 740. Such automated phone systems are well known, and need not be described in detail herein. Preferably, however, the automated phone system 735 has access to one or more databases 745 or other sources of information, such that the automated phone system can retrieve any data necessary to preparing the repair estimate. For example, the automated phone system 735 may have access to the databases $DB_1$-$DB_n$ used by the Internet-based system 5 discussed previously.

Figure 29:
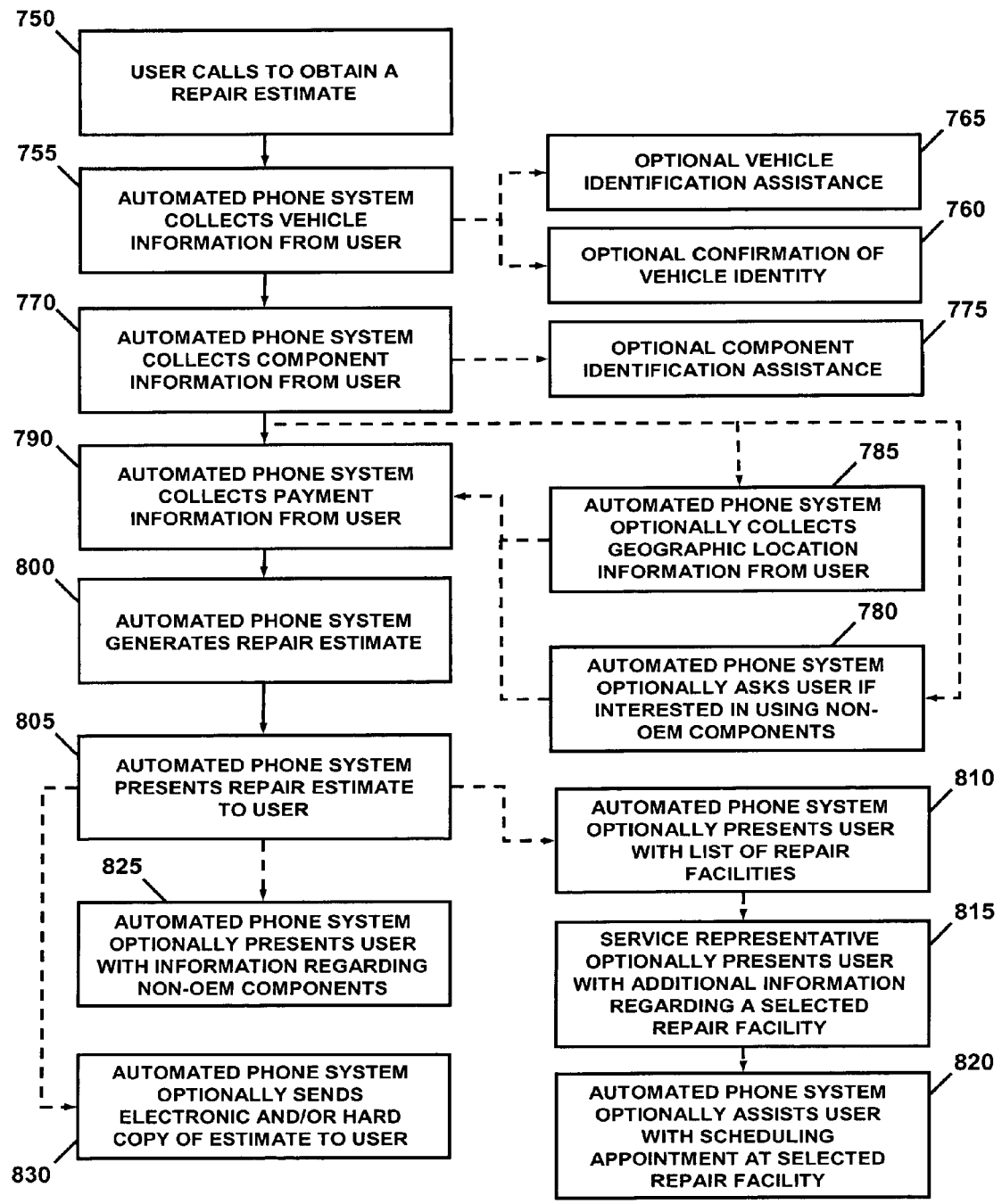
FIG. 29 is a flow diagram illustrating the steps of a method of obtaining a repair estimate using the system of FIG. 28.

In the method described by FIG. 29, a user initially calls a provided telephone number to obtain a repair estimate 750. The user is subsequently connected with an automated phone system. In a similar manner to the Internet-based system and method discussed above, the automated phone system proceeds to collect vehicle information 755 from the user. The user may provide the vehicle information in various forms, such as by year/make/model or VIN, as described above. In one embodiment, the automated phone system may employ an auto-matching function, wherein a list of particular vehicle information available thereto is continually narrowed as the user enters additional alphanumeric characters via the telephone keypad. Such a function is commonly employed, for example, by automated phone systems tasked with guiding a caller through an employee directory. The automated phone system may optionally confirm the identification of the vehicle 760, and/or may optionally assist the user in identifying the vehicle 765.

The automated phone system also collects component information 770 from the user. The component information may be provided by part name, part number, or various other means. The automated phone system may again employ the auto-matching function described above in order to facilitate collection of component information. The automated phone system may optionally assist the user in identifying components needing repair or replacement 775. Once the requisite component information has been collected, the automated phone system may optionally query the user as to whether the user would like an estimate using aftermarket, remanufactured, and/or used components, as well as, or as opposed to, OEM components 780.

Preferably, but optionally, the automated phone system also collects from the user information regarding the geographic location of the repair 785. By collecting such information, the automated phone system-based estimate preparation system will be better able to provide an accurate repair estimate to the user.

Once all of the necessary information has been collected, and the automated phone system has queried the user as to the possible estimate options, the automated phone system preferably proceeds to collect the user's payment information 790. Payment for the estimate may be accepted in multiple forms, such as by credit card, debit card, electronic check, or any of various other forms known to those skilled in the art.

Upon approval of the user's payment information, the automated phone system initiates preparation of the repair estimate 800. The automated phone system may generate the repair estimate by transmitting the information received from the user into an appropriately designed software application running on a computer in communication with the automated phone system. Alternatively, the automated phone system may transmit the information into an Internet-based software application, or may utilize the Internet-based system 5 described above.

Upon completion of the repair estimate, the automated phone system orally presents the user with the total fair estimate for the repair(s) to be performed 805. Preferably, but not necessarily, the automated phone system also informs the user of other details relating to the estimate, such as, for example, the individual component costs, the total component cost, the total labor time, and the average labor rate. For a combination estimate, the automated phone system also preferably differentiates between the repair costs associated with using different types of components.

Once the repair estimate has been fully explained to the user, the automated phone system may offer to provide the user with a list of repair facilities nearby to the intended location of the repair 810. The list of repair facilities may be offered and/or provided in any form. For example, a list of all local repair facilities, or a list of only repair facilities in the area that will honor the fair repair estimate may be offered. The automated phone system may otherwise identify repair facilities in the area that will honor the fair repair estimate in a manner similar to that of an Internet-based system of the present invention.

If a user identifies of interest a particular repair facility, or facilities, from a list presented them by the automated phone system, the automated phone system may provide additional information regarding each repair facility to the user 815. Further, if the user is interested in scheduling a repair appointment with a particular repair facility, the automated phone system may be able to assist in scheduling the appointment for the user 820.

The automated phone system may also present detailed information regarding aftermarket, remanufactured, and/or used components utilized in the repair estimate to the user 825. For example, if the user is interested in effecting the vehicle repair using one or more of such components, the automated phone system may provide source, brand and/or other related information to the user. The automated phone system may further assist the user in reserving and/or purchasing such components.

As can be understood, the automated phone system-based system and method of obtaining a repair estimate, may provide for options and results similar to those of an Internet-based system and method. Most all of the information received and presented by the Internet-based system and method can be received and presented via the automated phone system-based system and method. Obviously, however, the graphical elements of the Internet-based system and method would be lacking from this embodiment.

When either a service representative-based or automated phone system-based method is used to obtain a vehicle repair estimate, it is preferred, but not necessary, that the user also be provided with a paper or electronic copy of the estimate(s) 730, 830. For example, a paper copy of the estimate(s) can be mailed to the user or an electronic copy of the estimate(s) can be e-mailed to the user (assuming the user provides an e-mail address) subsequent to generation of the estimate(s). In this manner, it is believed that the user is better able to fully comprehend the estimate(s).

As an ancillary matter to the actual preparation and presentation of a repair estimate, it is also contemplated that the present invention may consider alternate forms of participation in the estimate preparation and presentation process by entities such as repair facilities and component suppliers. Developing a list of repair facilities in a given geographical location that have agreed to honor a vehicle repair estimate generated by the system and method of the present invention has already been mentioned. It is also contemplated that such repair facilities may be willing to pay an advertising fee to be listed on a website associated with the present invention. Further, such repair facilities may be willing to provide blanket discounts, discount coupons, or some other type of cost reduction to users of the present invention in return for a theoretical increase in business produced by customers made aware of their existence. Similarly, component manufacturers, vendors, or auto salvage yards may be willing to offer similar discounts.

Therefore, as can be understood from a review of the foregoing discussion and accompanying drawing figures, the present invention is broadly directed to a system and method by which a user can obtain a repair estimate for a vehicle, without having an extensive knowledge of vehicles, or of vehicle repairs. Consequently, while certain exemplary embodiments of the present invention are described in detail above, the scope of the invention is not to be considered limited by such disclosure, and modifications are possible without departing from the spirit of the invention as evidenced by the following claims:

What is claimed is:

1. A computerized method for preparing and presenting to a vehicle owner a vehicle cost of repair estimate, comprising:
    (a) receiving at a server from said vehicle owner vehicle identification data regarding a vehicle to be repaired;
    (b) receiving at said server component identification data for at least one component of said vehicle to be repaired;
    (c) in response to receiving at said server said vehicle identification data and said component identification data, retrieving from one or more databases:
        (1) vehicle manufacturer component cost data associated with said at least one component;
        (2) vehicle manufacturer labor time data associated with said at least one component; and
        (3) labor rate data associated with said at least one component;
    (d) determining at said server an average labor rate for completing a repair with said at least one component, said average labor rate representative of labor rates at a plurality of repair facilities;
    (e) automatically calculating at said server a cost of repair estimate using:
        (1) said vehicle manufacturer component cost data associated with said at least one component;
        (2) said vehicle manufacturer labor time data associated with said at least one component; and
        (3) said average labor rate data associated with said at least one component; and
    (f) transmitting from said server for display to said vehicle owner said cost of repair estimate.

2. The method of claim 1 wherein receiving at a server from said vehicle owner vehicle identification data comprises receiving a vehicle identification number (VIN).

3. The method of claim 1 wherein determining at said server an average labor rate comprises retrieving said average labor rate from a labor rate database.

4. The method of claim 1 wherein determining at said server an average labor rate comprises calculating said average labor rate using a plurality of rates from a labor rate database.

5. The method of claim 1 wherein determining at said server an average labor rate comprises calculating said average labor rate using a plurality of rates in a geographic area.

6. The method of claim 1 wherein said geographic area is determined according to a zip code received from said vehicle owner.

7. The method of claim 1 wherein determining at said server an average labor rate comprises determining a nationwide average labor rate.

8. The method of claim 1 wherein said component identification data is provided by a method selected from the group consisting of:

(1) entering a part number;

(2) entering a component name; and (3) selecting a component from a list.

9. The method of claim 1 further comprising, subsequent to receiving component identification data regarding said at least one component, presenting said vehicle owner with a summary list of components.

10. The method of claim 1 further comprising receiving from said vehicle owner a selection of an option of preparing said cost of repair estimate using components selected from the group consisting of aftermarket, remanufactured, and used components.

* * * * *